US012657399B2

(12) United States Patent
Pitkin et al.

(10) Patent No.: US 12,657,399 B2
(45) Date of Patent: Jun. 16, 2026

(54) MACHINE LEARNING GENERATION AND REFINEMENT OF GROUP MESSAGING IN A DATABASE SYSTEM VIA GENERATIVE LANGUAGE MODELING

(71) Applicant: Salesforce, Inc., San Francisco, CA (US)

(72) Inventors: Scott Pitkin, Bloomington, IN (US); Michael Aurelio, Novato, CA (US); Jonathan Belkowitz, Brooklyn, NY (US); Allen Hoem, Indianapolis, IN (US); Amrutha Krishnan, San Bruno, CA (US); Abigail Kutruff, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 194 days.

(21) Appl. No.: 18/419,844

(22) Filed: Jan. 23, 2024

(65) Prior Publication Data

US 2025/0086403 A1 Mar. 13, 2025

Related U.S. Application Data

(60) Provisional application No. 63/581,499, filed on Sep. 8, 2023, provisional application No. 63/581,501, filed on Sep. 8, 2023.

(51) Int. Cl.
*G06F 40/40* (2020.01)
*G06Q 30/0242* (2023.01)

(52) U.S. Cl.
CPC ......... *G06F 40/40* (2020.01); *G06Q 30/0243* (2013.01)

(58) Field of Classification Search
USPC ............................................... 704/7–10, 257
See application file for complete search history.

(56) References Cited

U.S. PATENT DOCUMENTS

| | | | | |
|---|---|---|---|---|
| 8,577,918 | B2 * | 11/2013 | Collins | G06Q 30/02 725/42 |
| 9,882,851 | B2 * | 1/2018 | Gunasekara | G06Q 10/107 |
| 11,199,951 | B1 | 12/2021 | Wittke et al. | |
| 11,475,207 | B2 | 10/2022 | Xie et al. | |
| 11,516,105 | B2 | 11/2022 | Aurelio et al. | |
| 11,609,954 | B2 | 3/2023 | Wittke et al. | |

(Continued)

*Primary Examiner* — Leonard Saint-Cyr
(74) *Attorney, Agent, or Firm* — Polygon IP, LLP

(57) ABSTRACT

A computing services environment may include a database system, a generative language model interface, a communication interface, and a messaging interface. The database system may store database records reflecting interactions between tenants of the computer services environment and individuals interacting with the tenants, and may determine an input description of a communication campaign between a tenant of the plurality of tenants and a corresponding segment of the individuals. The generative language model interface may determine a textual description of one or more elements of the communication campaign by completing a campaign brief generation prompt via a generative language model. The communication interface may transmit to a client machine authenticated to a database system account linked to the tenant an instruction to generate a graphical user interface at the client machine. The messaging interface may transmit messages based on the input description and the refinement.

16 Claims, 20 Drawing Sheets

(56) References Cited

U.S. PATENT DOCUMENTS

| | | | |
|---|---|---|---|
| D988,336 | S | 6/2023 | Pitkin et al. |
| D988,351 | S | 6/2023 | Pitkin et al. |
| D1,009,923 | S | 1/2024 | Pitkin et al. |
| D1,010,672 | S | 1/2024 | Pitkin et al. |
| 2021/0157974 | A1 | 5/2021 | Xie et al. |
| 2021/0367873 | A1 | 11/2021 | Aurelio et al. |
| 2021/0373724 | A1 | 12/2021 | Wittke et al. |
| 2021/0390142 | A1 | 12/2021 | Wittke et al. |
| 2022/0035883 | A1 | 2/2022 | Pitkin et al. |
| 2022/0293107 | A1* | 9/2022 | Leaman .................. G10L 15/26 |
| 2023/0077698 | A1 | 3/2023 | Aurelio et al. |
| 2025/0005615 | A1* | 1/2025 | Ugane ................ G06Q 30/0242 |
| 2025/0080577 | A1* | 3/2025 | Singh .................. H04L 63/1425 |
| 2025/0238842 | A1* | 7/2025 | Guin .................. G06Q 30/0276 |

* cited by examiner

400

Campaign Generation Language Model Tuning Method —900

Receive a request to tune a generative language model for campaign generation —902

Identify initial tuning data for the generative language model —904

Identify campaign generation input and output information —906

Identify a prompt template —908

Determine a generative language model prompt based on the prompt template and the input and output information —910

Determine a prompt completion based on the prompt —912

Determine updated tuning data based on a comparison between the prompt completion and the output information —914

Continue tuning the generative language model? —916

Yes

No

Store the tuning data —918

Done

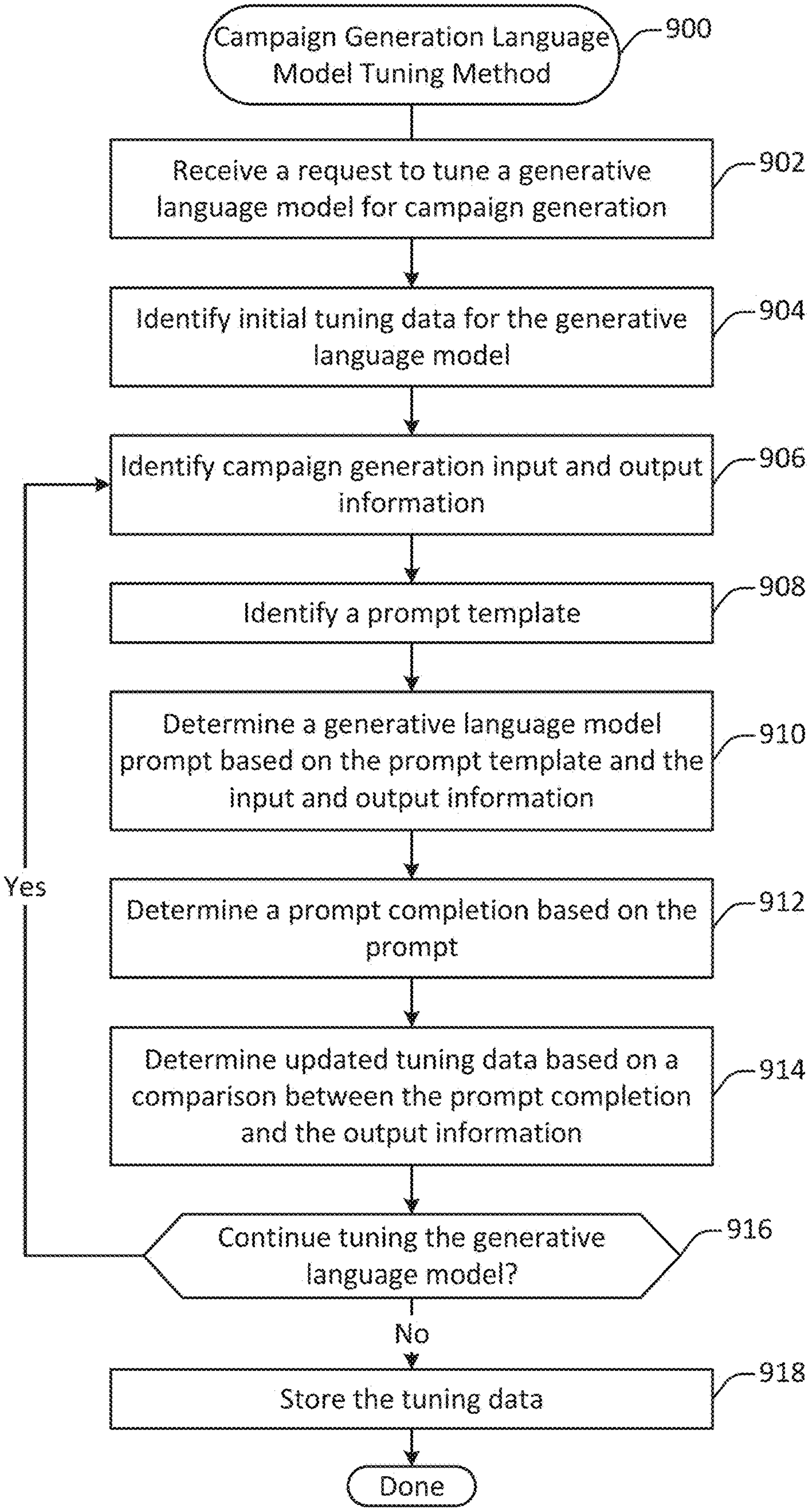

Figure 9

MACHINE LEARNING GENERATION AND REFINEMENT OF GROUP MESSAGING IN A DATABASE SYSTEM VIA GENERATIVE LANGUAGE MODELING

CROSS-REFERENCE TO RELATED APPLICATIONS

This application claims the benefit under 35 U.S.C. § 119(e) of U.S. Provisional Patent Application 63/581,499 by Pitkin and Aurelio, titled: "MACHINE LEARNING GENERATION OF CAMPAIGN BRIEF AND ASSETS IN A DATABASE SYSTEM", filed Sep. 8, 2023, and claims the benefit under 35 U.S.C. § 119(e) of U.S. Provisional Patent Application 63/581,501 by Pitkin and Aurelio, titled: "MACHINE LEARNING GENERATION, EXPERIMENTATION, AND REFINEMENT OF CAMPAIGN ASSETS IN A DATABASE SYSTEM", filed Sep. 8, 2023, both of which are incorporated herein by reference in its entirety and for all purposes.

FIELD OF TECHNOLOGY

This patent application relates generally to database systems, and more specifically to interactions between large language models and database systems to generate user interfaces for campaign briefs.

BACKGROUND

Database systems storing customer relations management data include a wealth of information that may shed light on customer demand. However, gleaning insights from such information remains a manual and time-consuming process. For example, developing a campaign to reach customers typically requires a sequence of manual decisions by an administrator. Moreover, conventional techniques for campaign creation provide few solutions for converging on better campaign decisions.

Accordingly, improved techniques for generating and executing campaigns based on information stored in database systems are needed. Developing such techniques presents a technical challenge to overcome due to the large amount of data stored in customer relations management database systems, as well as the unstructured nature of much of that data.

BRIEF DESCRIPTION OF THE DRAWINGS

The included drawings are for illustrative purposes and serve only to provide examples of possible structures and operations for the disclosed inventive systems, apparatus, methods, and computer program products for campaign brief generation. These drawings in no way limit any changes in form and detail that may be made by one skilled in the art without departing from the spirit and scope of the disclosed implementations.

FIG. 6 and FIG. 7 illustrate user interfaces generated in accordance with one or more embodiments.

FIG. 9 illustrates a method of tuning a campaign generation language model, performed in accordance with one or more embodiments.

DETAILED DESCRIPTION

Techniques and mechanism described herein provide for the assisted generation and execution of a campaign based on information stored in and accessed via an on-demand database system providing computing services to tenants via the internet. The database system may include a machine learning subsystem capable of processing data stored in the database to determine a campaign recommendation for messaging one or more target audiences about one or more opportunities. The database system then determines a campaign brief characterizing the campaign recommendation, and updates that campaign brief based on one or more refinements. A campaign brief preview including one or more content samples may be determined, and one or more updated content samples may be determined based on user input. Next, one or more campaign content experiments may be determined, after which the campaign may be executed and refined based on data collected from the one or more campaign content experiments.

Various embodiments described herein relate to a computing services environment that includes a campaign generation system, a database system, and one or more application servers. The database system may be configured to execute database queries to support one or more applications provided via the application servers. The campaign generation system may include a generative language model interface which, supported by the database system, generates instructions for conducting a communication campaign between the computing services environment and one or more recipients. The computing services environment may execute the instructions to transmit the communication on behalf of a tenant of the computing services environment.

Techniques and mechanisms described herein relate to the generation of communication campaigns based on campaign recommendations (also referred to herein as campaign opportunities). In some embodiments, a campaign recommendation may be produced by a machine learning model. Alternatively, a campaign recommendation may be determined based on user input. A campaign recommendation may include one or more of a communication objective, a communication channel, a communication audience, and a communication asset to employ in the context of the communication.

Figure 1:
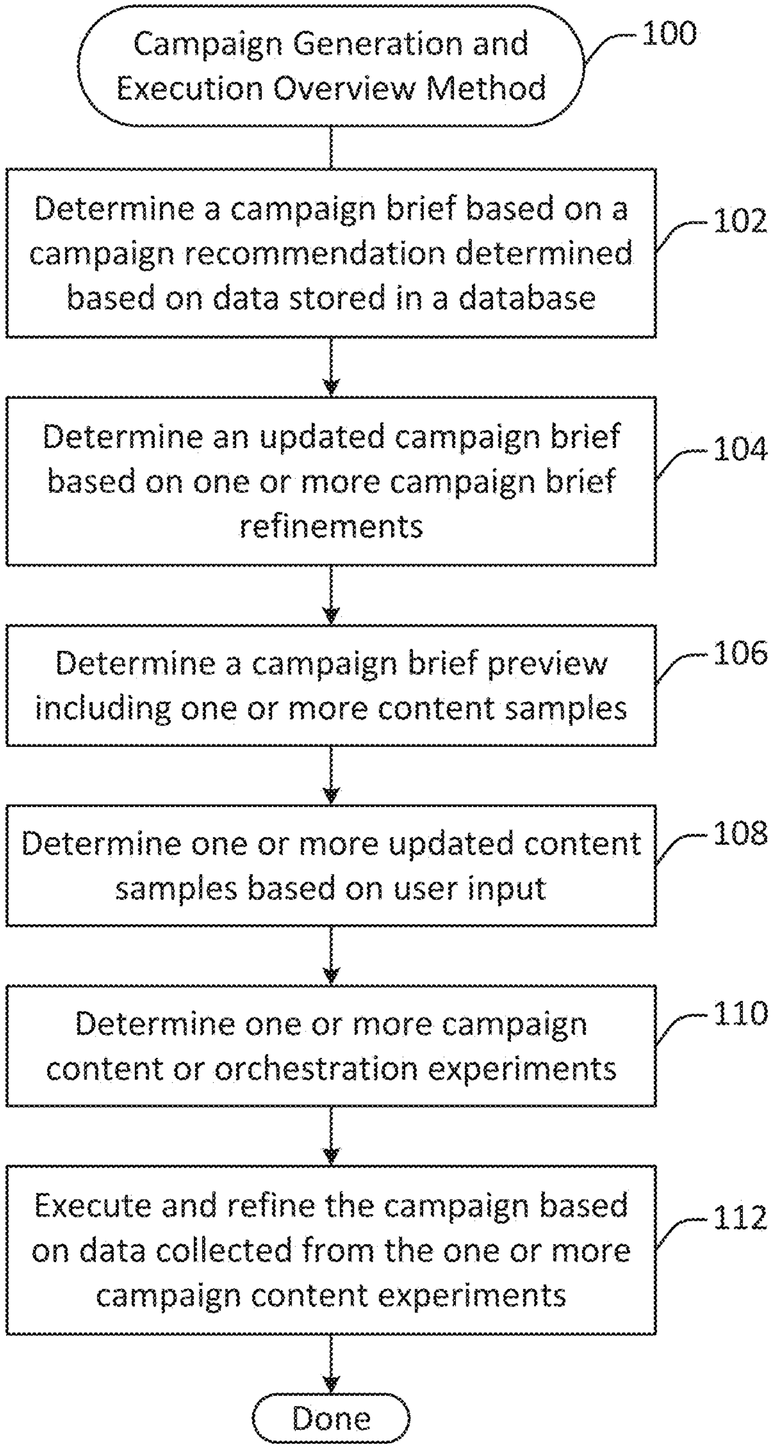
FIG. 1 illustrates an overview method for generating and executing a campaign, performed in accordance with one or more embodiments.

FIG. 1 illustrates an overview method 100 for generating and executing a campaign, performed in accordance with one or more embodiments. The method 100 may be performed at an on-demand database system such as the systems shown in FIG. 17, FIG. 18A, FIG. 18B, and/or FIG. 11.

A campaign brief is determined at 102 based on a campaign recommendation determined based on data stored in a database system. In some embodiments, the campaign brief may include a collection of information such as a key message, a target audience, a messaging channel (e.g., email, text, etc.), orchestration information (e.g., frequency and timing of recommended content), and one or more messages for communicating with the target audience about one or more opportunities. The campaign recommendation may be determined at least in part by applying a large language model to complete a prompt that includes some or all of the campaign recommendation. The campaign recommendation may be determined in accordance with brand guidelines for tone and content. Additional details regarding the determination of a campaign brief are discussed with respect to the method 200 shown in FIG. 2.

At 104, an updated campaign brief is determined based on one or more campaign brief refinements. In some embodiments, campaign brief refinement may include textual user input. For instance, a user may provide one or more instructions via a chat interface indicating how to refine the campaign brief. Such instructions may be processed by a large language model to determine how to update the campaign brief based on the refinement. The refinement may be executed when so indicated by a user.

At 106, a campaign brief preview including one or more content samples is determined. In some embodiments, the campaign brief preview may include a graphical overview of the campaign brief. The graphical overview may include information about the targeted segment, including its composition, communication preferences, estimated uptake, and the like. The one or more content samples may include assets such as images selected by a machine learning system and paired with information such as specific product offerings and target market segments.

At 108, one or more updated content samples are determined based on user input. In some embodiments, determining the updated content samples may involve receiving user input selecting or deselecting some or all of one or more of the automatically generated content samples. Based on this user input, new samples may be generated, for instance to replace those that were deselected. Additional details regarding the determination of an updated campaign brief and the determination of a campaign brief preview are discussed with respect to the method 500 shown in FIG. 5. Additional details regarding the determination of content samples and the updating of content samples based on user input are discussed with respect to the method 1000 shown in FIG. 10.

One or more campaign content and/or orchestration experiments are determined at 110. In some embodiments, a campaign experiment may be a test (e.g., an A/B test) to collect empirical data providing evidence as to the efficacy of particular elements of the campaign. Examples of the types of experiment that may be employed may include, but are not limited to, experiments designed to evaluate different content samples, different communication channels (e.g., email vs. SMS), different message timings, and the like. The campaign content experiments may be generated by, for instance, a machine learning system configured to predict user responses and/or to identify ambiguous information that would benefit from experimentation.

At 112, the campaign is executed and refined based on data collected from the one or more campaign content experiments. In some embodiments, executing the campaign may involve transmitting one or more messages from the database system to one or more users. A message may include, for instance, a text message and/or one or more content samples adapted, generated, and/or selected for a particular target audience segment. Additional details regarding campaign experimentation and execution are discussed with respect to the method 1300 shown in FIG. 13.

Figure 2:
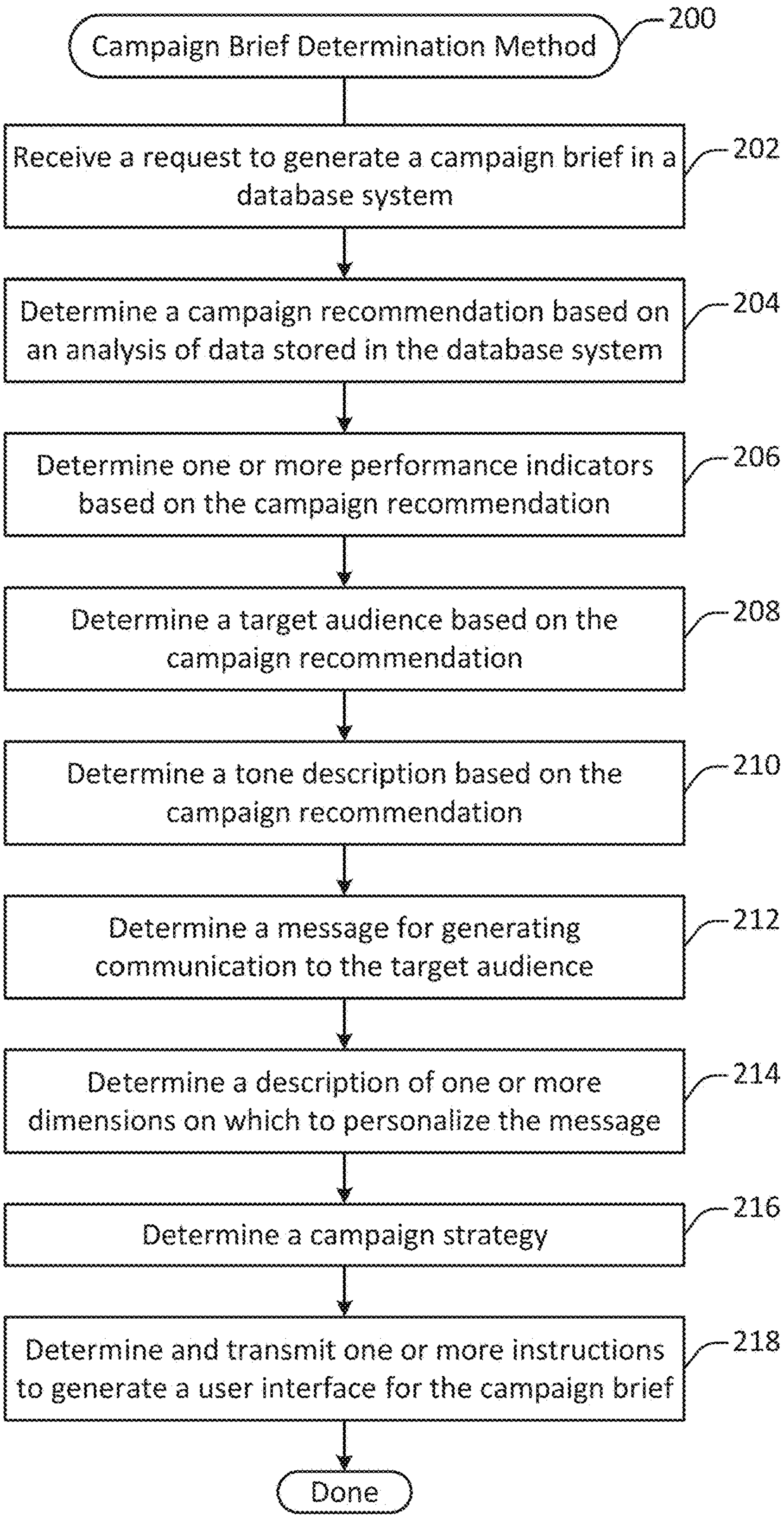
FIG. 2 illustrates a method of determining a campaign brief, performed in accordance with one or more embodiments.

FIG. 2 illustrates a method 200 of determining a campaign brief, performed in accordance with one or more embodiments. In some embodiments, the method 200 may be performed at a database system providing computing services to various tenants via the internet.

A request to generate a campaign brief in a database system is received at 202. In some embodiments, the campaign brief may provide a basis for facilitating communications with users and/or companies about one or more opportunities, for instance one or more opportunities provided by a tenant of the database system. The request may be received via a graphical user interface, such as one of the user interfaces 300, 400, and 500 shown in FIG. 3, FIG. 4, or FIG. 5.

A campaign recommendation is determined at 204 based on an analysis of data stored in the database system. In some embodiments, the campaign recommendation may be determined by a machine learning engine configured to analyze data associated with a tenant of the database system. For example, the machine learning engine may identify a market segment characterizing a set of individuals corresponding to database records indicating that the set of individuals is underserved by a revenue generation stream associated with the tenant.

Figure 3:
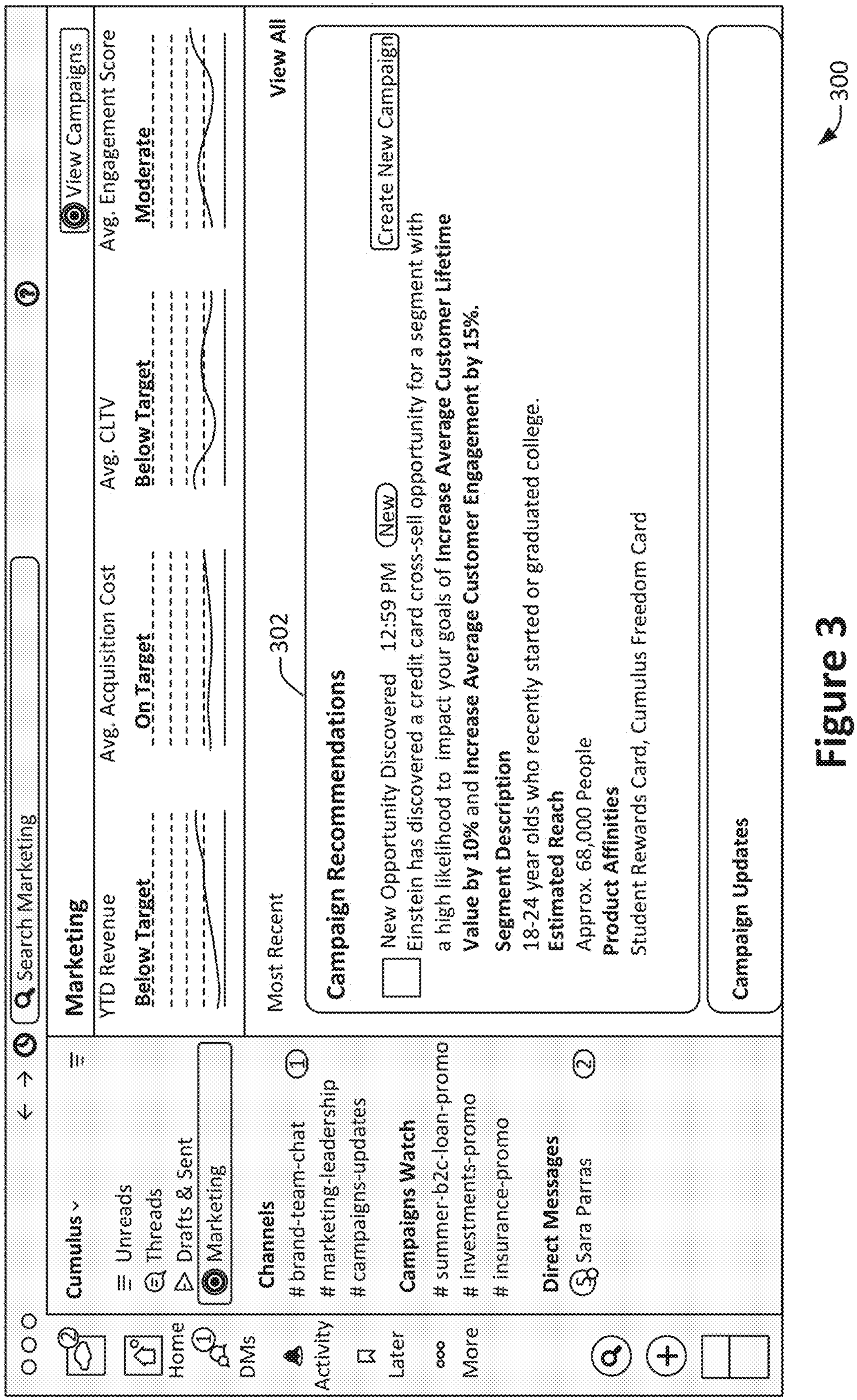
FIG. 3 illustrates an example of a user interface generated in accordance with one or more embodiments.

FIG. 3 illustrates an example of a user interface generated in accordance with techniques and mechanisms described herein. An example of a campaign recommendation is shown at 302. The campaign recommendation example 302 has identified a segment of individuals, in this case approximately 68,000 18-24-year-olds who recently started or graduated college. The campaign recommendation example 302 also identifies a revenue stream, in this case a credit card cross-sell opportunity for particular credit card products, that could potentially increase customer value and average engagement.

Returning to FIG. 2, one or more performance indicators are determined at 206 based on the campaign recommendation. In some embodiments, the one or more performance indicators may be extracted from the campaign recommendation itself, for instance via textual analysis, or by analyzing metadata associated with the campaign recommendation.

Figure 4:
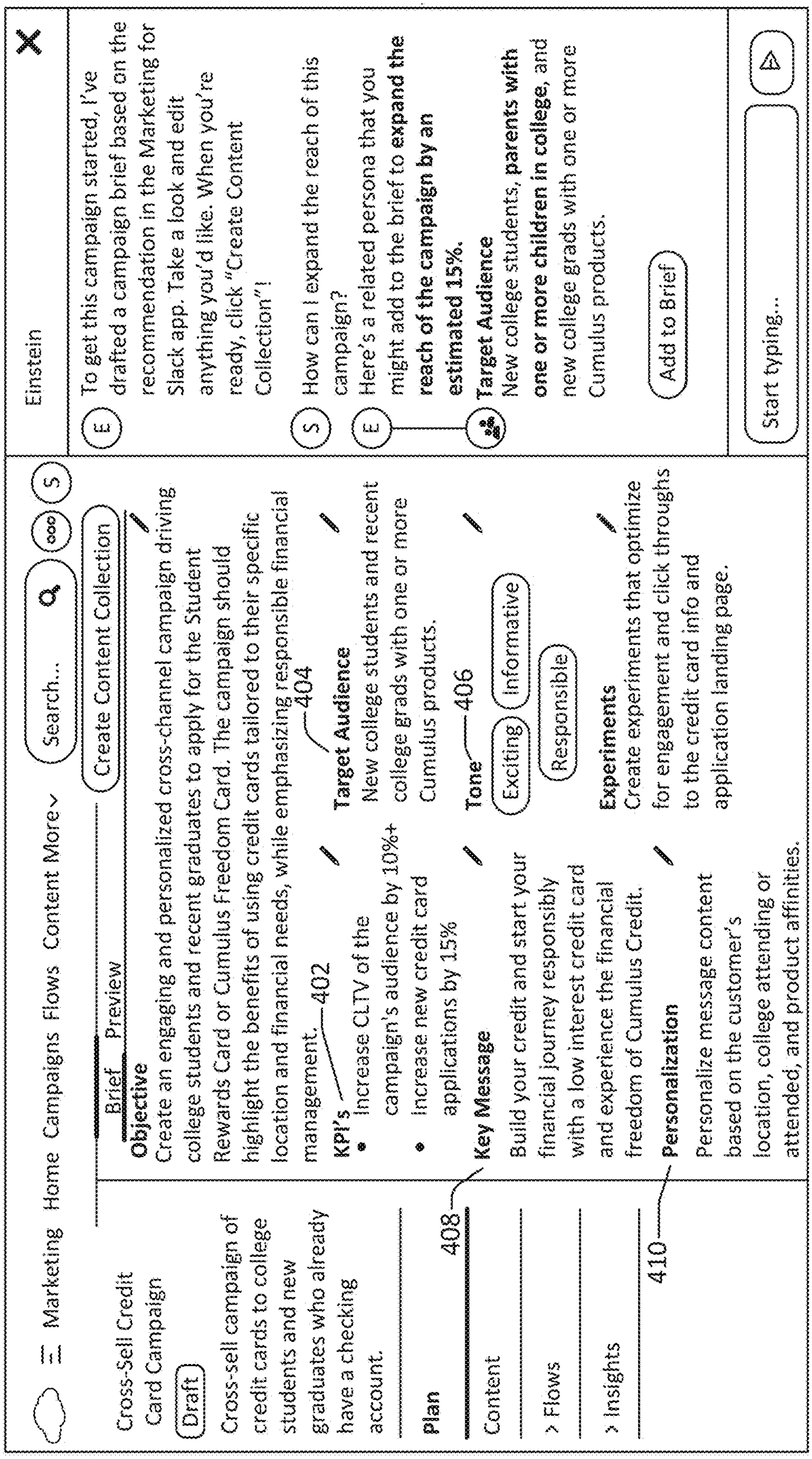
FIG. 4 illustrates an example of a user interface generated in accordance with one or more embodiments.

FIG. 4 illustrates an example of a user interface generated in accordance with techniques and mechanisms described herein. Examples of performance indicators are shown at 402. For instance, one performance indicator identifies an increase in CLTV of the campaign's audience by 10%+, while another performance indicator identifies an increase in new credit card applications by 15%.

Returning to FIG. 2, a target audience is determined at 208 based on the campaign recommendation. In some embodiments, the target audience may include a description determined based on text and/or metadata associated with the campaign recommendation. For instance, in FIG. 4, the target audience description 404 identifies new college students and recent college graduates who already have one or more products associated with the database tenant.

A tone description is determined at 210 based on the campaign recommendation. In some embodiments, the tone description may be determined based on any of various factors, such as the target audience, the type of opportunity the campaign is focused on, and/or predetermined branding information for an organization. For instance, a company may provide a description of its preferred tone for branding, which may be stored in a brand center within the computing services environment. In FIG. 4, the tone at 406 includes the tags "exciting", "informative", and "responsible," which reflect a suitable tone for targeting a credit card at new college students and recent college graduates.

A key message for generating communication to the target audience is determined at 212. In some embodiments, the message may be determined based on novel text generated by a large language model. The novel text may reflect a call to action directed to the target audience, identifying the opportunity, and reflecting the tone identified at 210. For instance, in FIG. 4, a key message is shown at 408 inviting the reader to build credit.

A description of one or more dimensions on which to personalize the message is determined at 214. In some embodiments, the description of one or more personalization dimensions may include a natural language instruction identifying variable characteristics associated with the target audience that may be used to refine the key message. Such characteristics may include, for example, calculated attributes, attributes selected from a unified profile for the target segment, product recommendations compiled from other personalization services, and/or any other sources of personalization information. For instance, in FIG. 4, the personalization description 410 identifies a customer's location, college attended or attending, and product affinities as dimensions on which the key message determined at 212 may be personalized.

According to various embodiments, one or more of the determinations made at 206 through 212 may be made at least in part based on text generated by a large language model such as Google Bard or ChatGPT. For instance, a large language model may be provided with a prompt generated based on a prompt template. The prompt template may include one or more natural language instructions for generating the textual elements, as well as one or more fillable portions. The one or more fillable portions may be filled with information retrieved from the database system, such as the campaign brief determined as discussed with respect to operation 202. The prompt may be generated by filling the one or more fillable portions in the prompt template. The prompt may then be completed by the large language model to create a prompt completion that includes novel text that may be used to provide one or more of the elements shown in FIG. 4.

A campaign strategy is determined at 216. In some embodiments, the campaign strategy may identify, for the selected performance indicators, a recommendation regarding an orchestrated set of messages. For instance, a particular campaign strategy may include a "welcome flow" where multiple messages are sent over time to onboard a new user to a service. Thus, a campaign strategy may include information such as the number and types of communications to be conducted.

Figure 6:
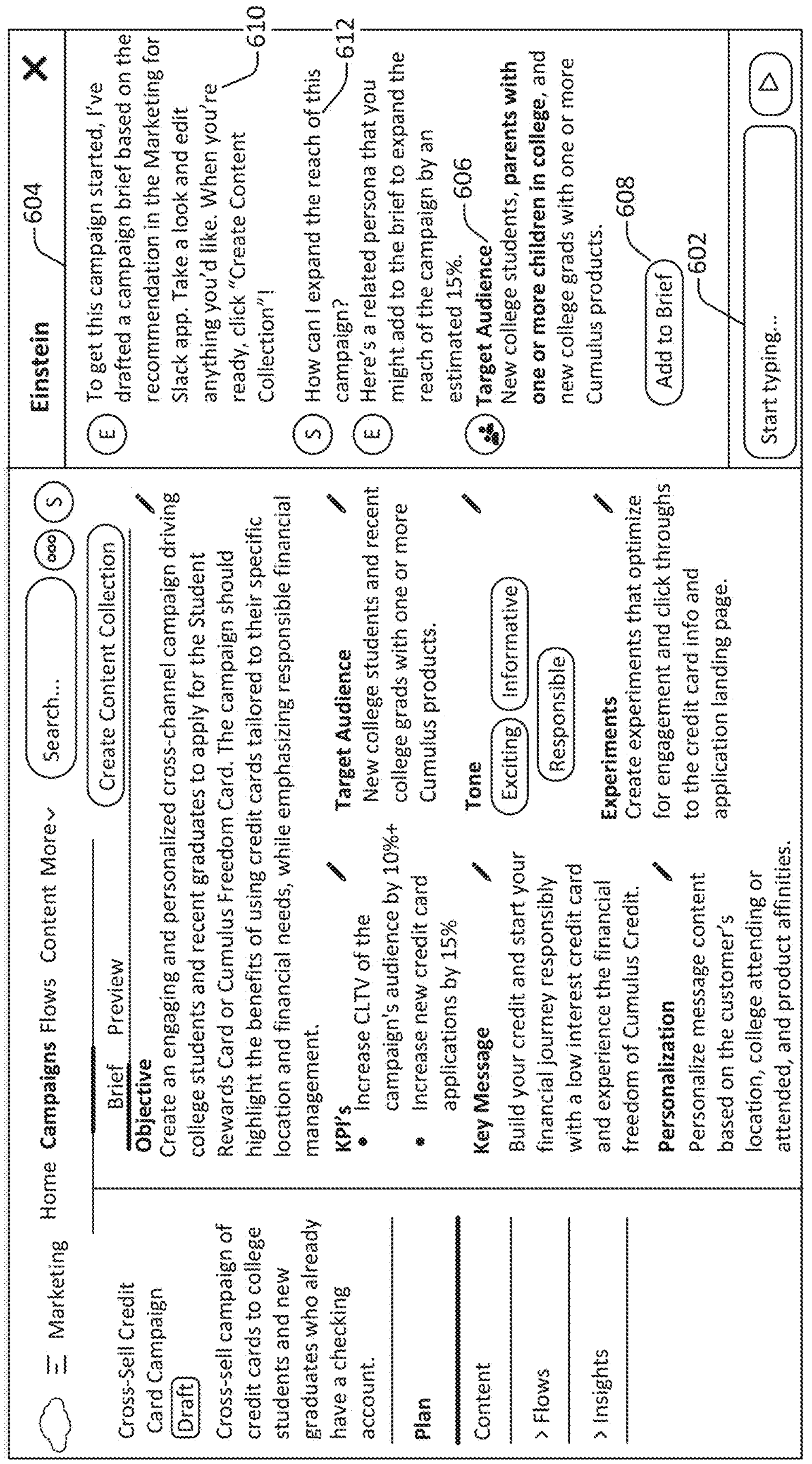
FIG. 6 illustrates an example of a user interface generated in accordance with one or more embodiments.
Figure 7:
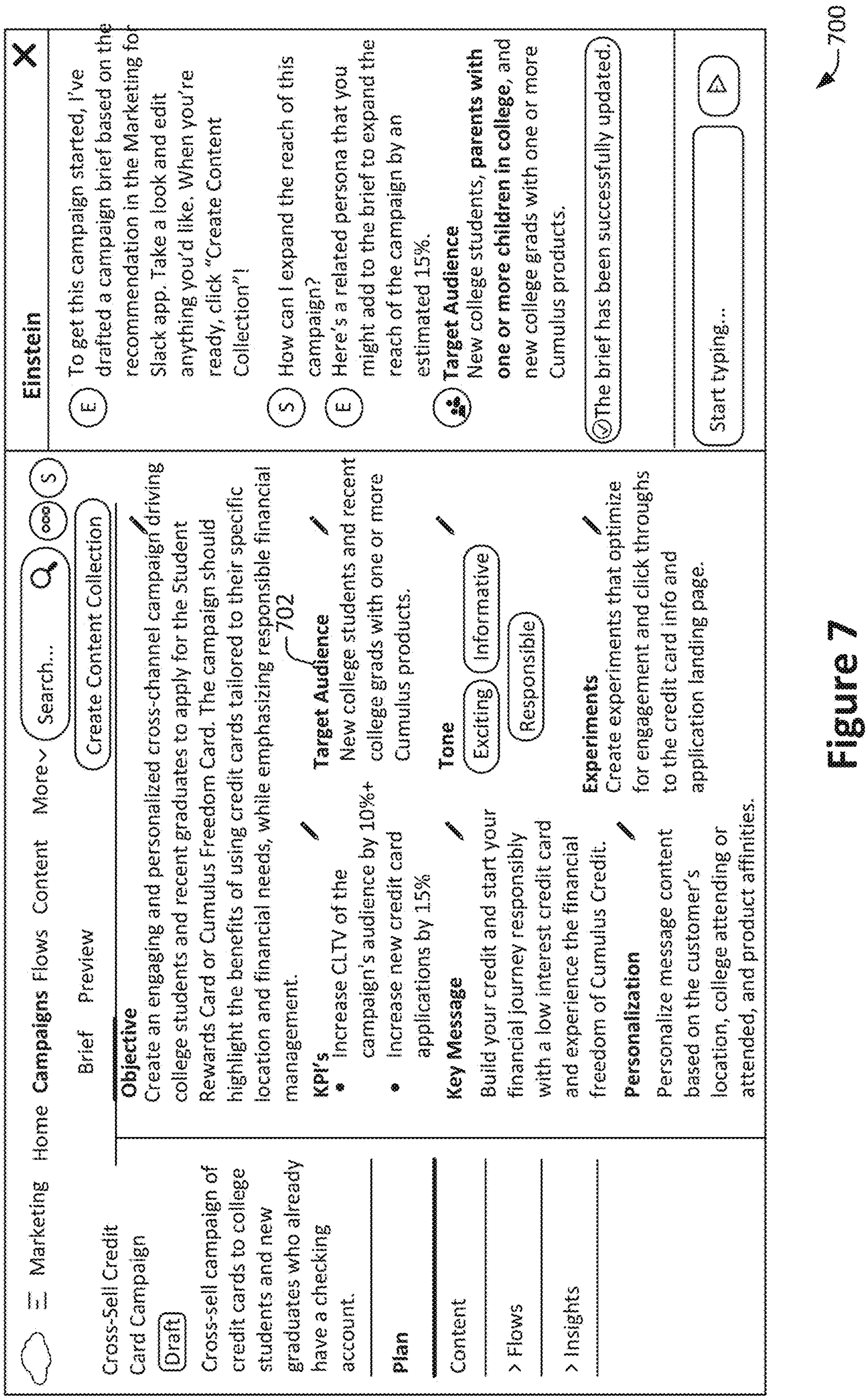
Figure 20:
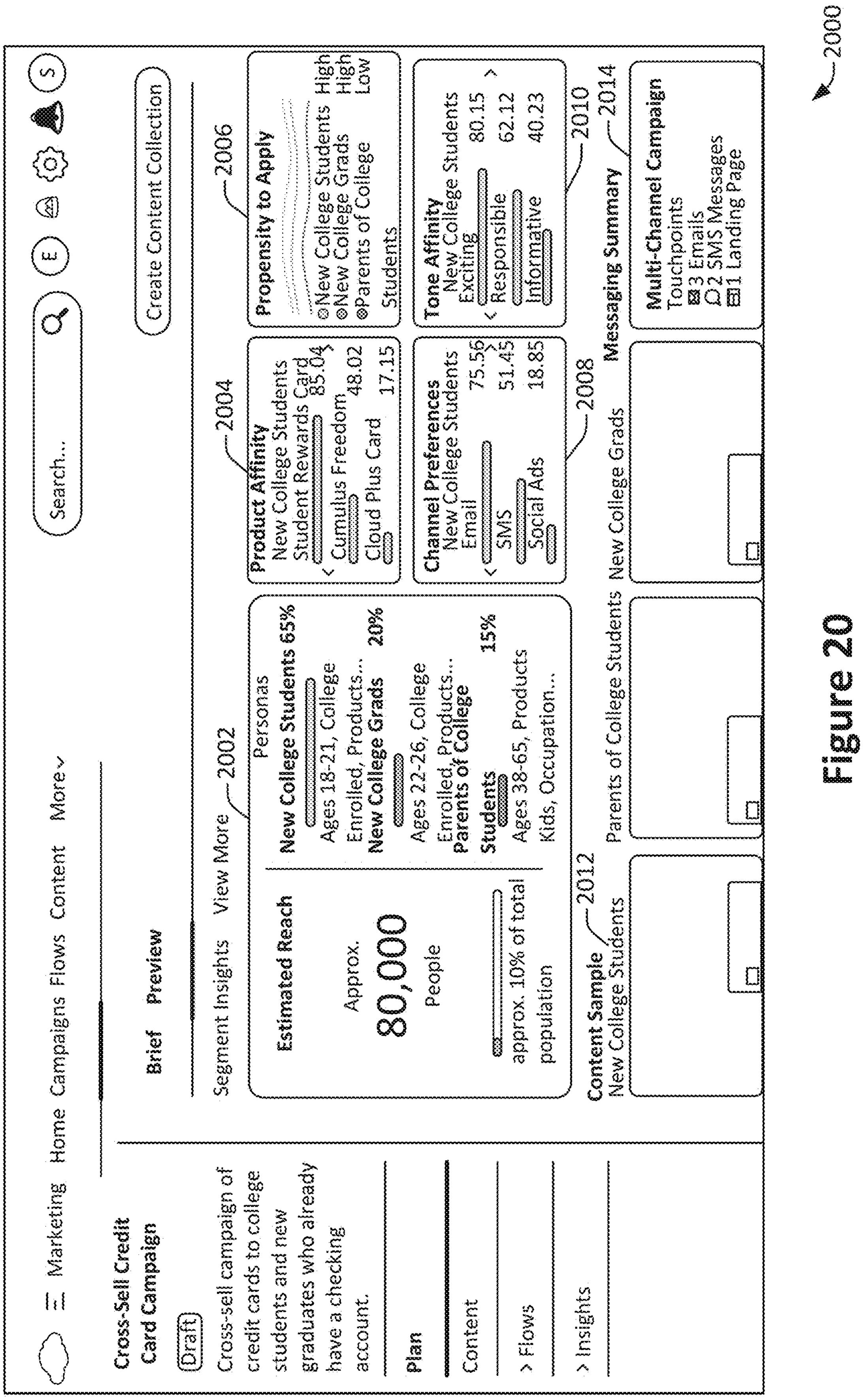
FIG. 20 illustrates a user interface generated in accordance with one or more embodiments.

One or more instructions to generate a user interface for the campaign brief are determined and transmitted at 218. In some embodiments, the user interface may be generated at a client machine in communication with the database system. The client machine may establish a secure communication session with the database system by authenticating to a user account authorized to perform actions related to a database tenant. Examples of such user interfaces 600, 700, and 2000 are shown in FIG. 6, FIG. 7, and FIG. 20.

Figure 5:
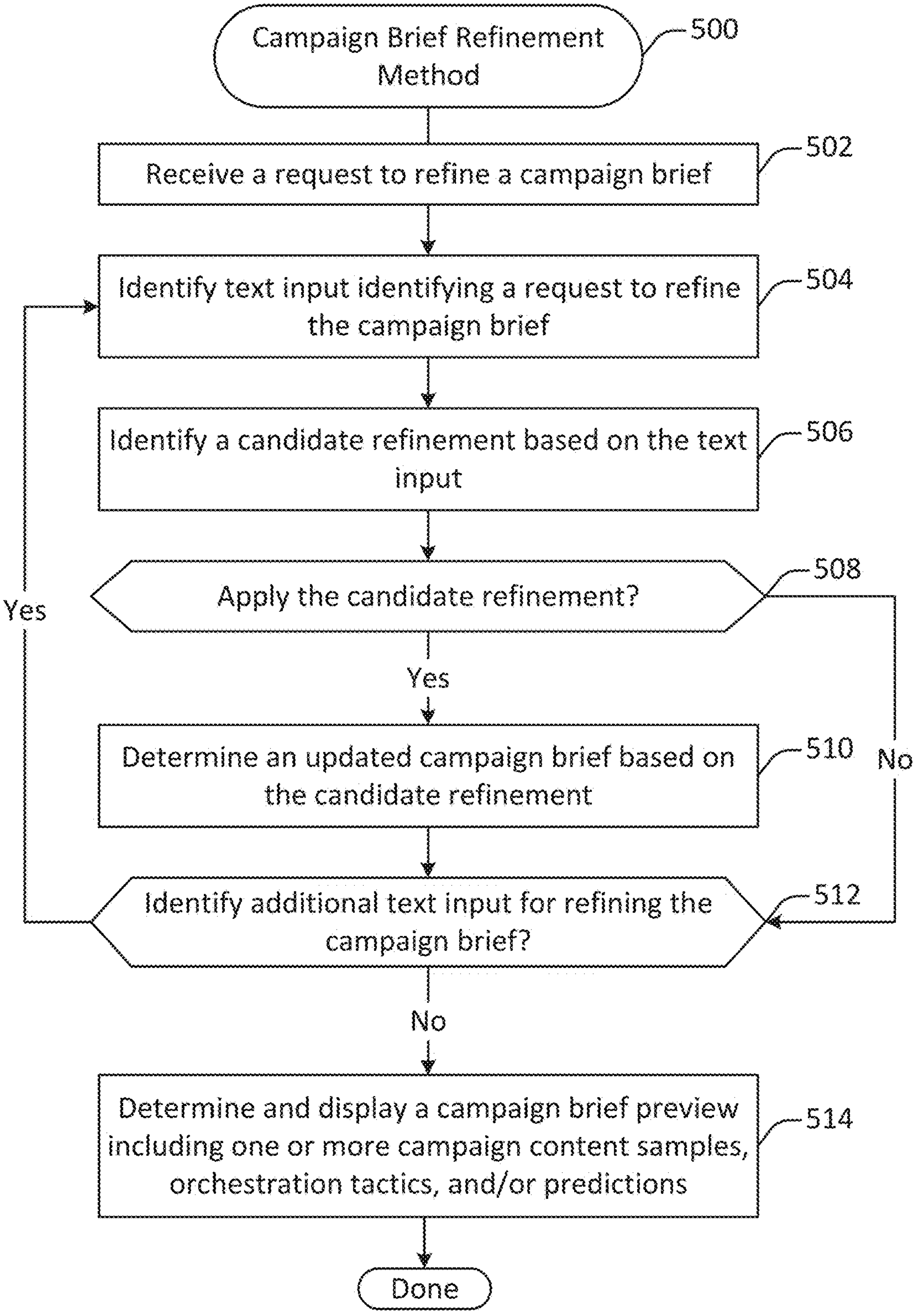
FIG. 5 illustrates a method for refining a campaign brief, performed in accordance with one or more embodiments.

FIG. 5 illustrates a method 500 for refining a campaign brief, performed in accordance with one or more embodiments. The method 500 may be performed in order to revise a campaign brief generated as discussed with respect to the method 200 shown in FIG. 2 based on user feedback.

A request to refine a campaign brief is received at 502. In some embodiments, the request may be generated automatically, for instance after a campaign has been generated. Alternatively, the request may be generated when user input is received.

Text input identifying a request to refine the campaign brief is identified at 504. In some embodiments, the request may be received via a user interface element such as a chat interface. FIG. 6 illustrates an example of a user interface generated in accordance with techniques and mechanisms described herein. In FIG. 6, user input may be provided at 602. A record of entered user input as well as dynamically generated response text may then be reflected in a visual chat log at 604. For example, the visual chat log 604 includes a first message 610 generated by the system stating that the campaign brief was automatically generated based on the recommendation. Following that system-generated message, the visual chat log 604 includes a message 612 reflecting user input asking how to expand the reach of the campaign.

Returning to FIG. 5, a candidate refinement is identified at 506 based on the text input. In some embodiments, the candidate refinement may be identified by applying one or more natural language processing techniques to the user input. For instance, in FIG. 6, a candidate refinement is shown at 606. The candidate refinement addresses the request to expand the reach of the campaign by determining an updated target audience that includes parents with one or more children in college.

In some implementations, the candidate refinement may be identified at least in part based on communication with a large language model such as Google Bard or ChatGPT. For instance, a large language model may be provided with a prompt generated based on a prompt template. The prompt template may include one or more natural language instructions for generating the textual elements, as well as one or more fillable portions. The one or more fillable portions in the prompt template may be filled with information such as text from the visual chat log 604. The prompt may then be completed by the large language model to create a prompt completion that includes novel text that may be used to provide one or more of the elements shown in FIG. 4.

Returning to FIG. 5, a determination is made at 508 as to whether to apply the candidate refinement. In some embodiments, the determination may be made based on user input.

For instance, in FIG. 6, a user may provide a request to apply the candidate refinement by clicking the button at 608.

Returning to FIG. 5, the updated campaign brief is determined at 510 upon making a determination at 508 to apply the candidate refinement. FIG. 7 illustrates an example of a user interface generated in accordance with techniques and mechanisms described herein. In FIG. 7, the updated target audience in the updated campaign brief is shown at 702.

Returning to FIG. 5, a campaign brief preview including one or more campaign content samples, orchestration tactics, and/or predictions is determined and displayed at 514. In some embodiments, the campaign brief preview may include a graphical overview of the campaign brief. The orchestration tactics may identify, for instance, proposed timing and/or one or more proposed channels for the predictions. The predictions may include, for example, one or more predicted values for outcomes such as campaign efficacy, campaign response rates, campaign conversions, and/or other metrics.

For instance, FIG. 20 illustrates an example of a user interface generated in accordance with techniques and mechanisms described herein. As shown in FIG. 20, the campaign brief preview may include an estimate 2002 of the reach and composition of the audience targeted by the campaign. The campaign brief preview may also include a list of one or more products that may be of interest to some or all of the target audience. The campaign brief preview may also include an estimate of the propensity to apply of some or all of the target audience. The campaign brief preview may also include a list of channel preferences 2008 for contacting some or all of the target audience. The campaign brief preview may also include a characterization 2010 of the match between the tone and some or all of the target audience. The campaign brief preview may also include a summary 2014 of the number and types of communications to be conducted with some or all of the target audience.

In some embodiments, the campaign brief preview may include one or more campaign content samples 2012. A campaign content sample may be determined by using a machine learning system to identify an asset such as an image, a video clip, or an audio clip with which to communicate with some or all of the target audience. For example, a photo of a college campus may be selected for college students. As another example, a photo of a student and a parent may be selected for parents of college students. As yet another example, a photo of a laptop may be selected for new college graduates.

In some embodiments, determining a campaign content sample may involve matching products with audience segments. For example, a student rewards card may be matched with college students, a travel card may be matched with parents of college students, and a more generally applicable credit card may be matched with recent graduates.

Figure 8:
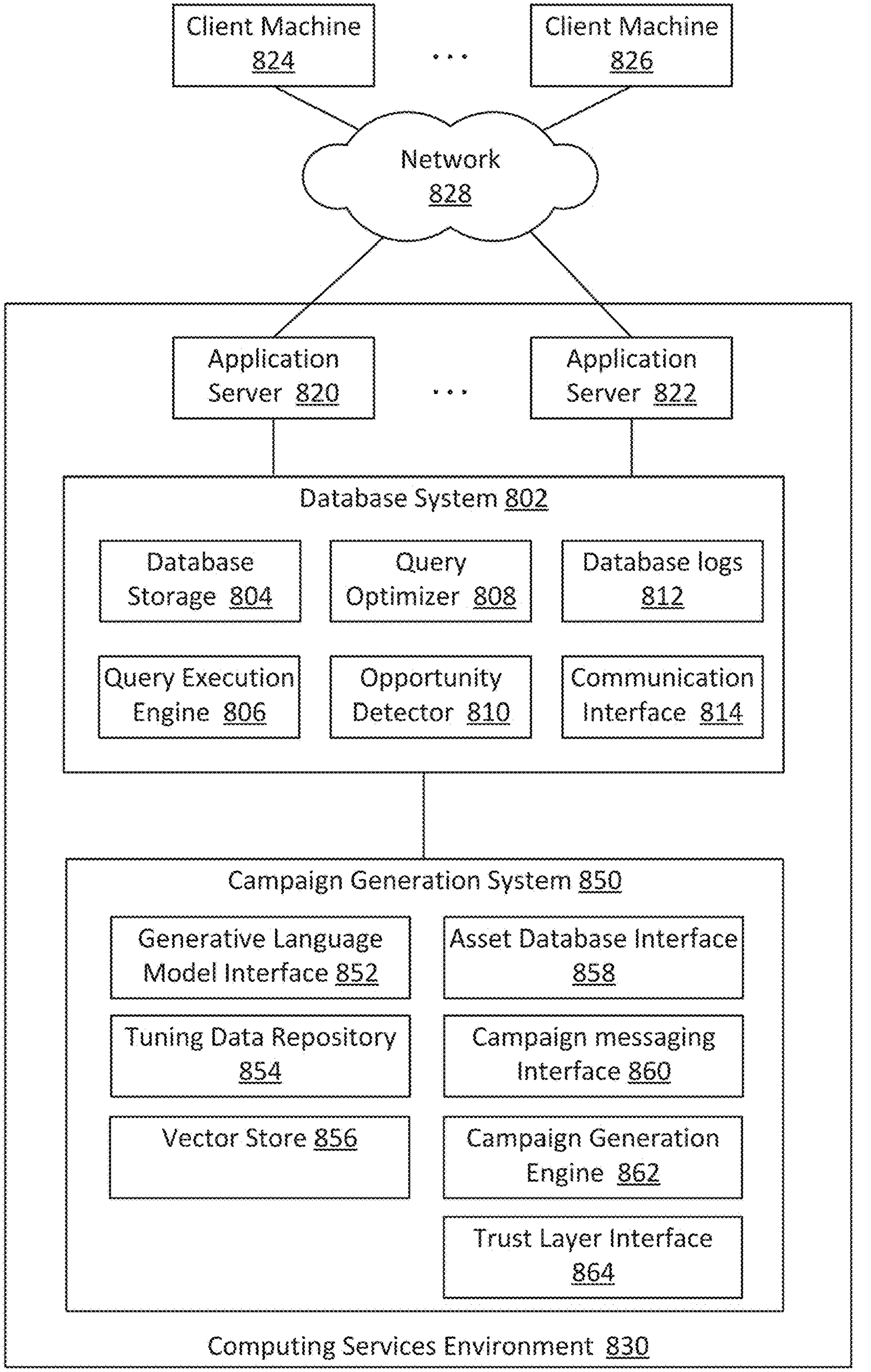
FIG. 8 illustrates a computing services environment configured in accordance with one or more embodiments.

FIG. 8 illustrates a computing services system 800 configured in accordance with one or more embodiments. The computing services system 800 includes one or more client machines 824 through 826 in communication with a computing services environment 830 via a network 828. The computing services environment 830 includes one or more application servers 820 through 822, a database system 802, and a campaign brief generation system 850. The database system 802 includes database storage 804, a query execution engine 806, a query optimizer 808, an opportunity detector 810, database logs 812, and a communication interface 814. The campaign generation system 850 includes a generative language model interface 852, a tuning data repository 854, a vector store 856, an asset database 858, an a messaging interface 860, a campaign generation engine 862, and a trust layer interface 864.

According to various embodiments, the one or more application servers 820 through 822 may provide any of various types of web-accessible computing applications to the client machines 824 through 826 via the network 828. For example, the web-accessible computing applications may include applications related to customer relations management, social networking, sales management, generative artificial intelligence, data storage, and/or other types of applications. Providing such applications may involve storing information to and retrieving information from the database system 802.

In some implementations, data stored in the database system 802 may be stored in the database storage 804, which may include one or more tables storing data for database tenants. Access to the data stored in the database storage 804 may be provided via the query execution engine 806, which may execute queries to store data to the database system 802 and/or retrieve data from the database system 802. Such queries may be determined by the query optimizer 808, which may receive requests from the application servers 820 through 822 and determine queries to be executed by the query execution engine 806. Communication with the database system 802 may be conducted via the communication interface 814.

In some embodiments, the database system 802 may be a multitenant database system. However, the techniques and mechanisms described herein are not limited to multitenant database systems, and instead are broadly applicable across various types and configurations of database systems. Moreover, the term "tenant" as used herein does not imply that a database system is necessarily "multitenant". For example, depending on the configuration, information for different tenants may be stored in different database tables or the same database table in accordance with techniques and mechanisms described herein.

According to various embodiments, the opportunity detector 810 monitors the database records and identifies underserved communication campaign opportunities. For example, the opportunity detector 810 may implement one or more machine learning processes to identify segments of individuals reflected in customer relations management records that have may be likely to exhibit interest in products and services provided by the tenant.

According to various embodiments, the campaign generation system 850 may communicate with the database system 802 to generate campaign briefs. The campaign generation system 850 may receive descriptions of opportunities identified by the opportunity detector 810, as well as other information such as data stored one or more database tables 804. The campaign generation engine 862 may process such information in conjunction with user input, assets selected from the asset database 858, and/or novel text generated by the generative language model interface 852 to generate and execute a campaign brief.

In some embodiments, interactions with a generative language model may be conducted at least in part based on guidance provided by the trust layer interface 864. The trust layer interface 864 may perform operations such as imposing prompt defense against prompt injection attacks, checking generated language for profanity, toxicity, and/or other unacceptable language.

In some embodiments, generating a campaign brief may involve determining campaign brief description information based on interactions with a generative language model via the generative language model interface 852. The generative language model may be tuned based on the information stored in the vector store 856 to generate novel text used by the campaign generation engine 862 to determine a campaign brief.

In some embodiments, the asset database interface 858 may be used to retrieve assets, such as images or videos, to include in a campaign brief. For instance, the campaign generation engine 862 may transmit a request to the asset database 858 identifying one or more characteristics of a requested asset. The asset database 858 may then select proposed assets based on the request and provide those to the campaign generation engine 862 for campaign brief generation.

In some embodiments, the asset database interface 858 may be used to generate assets, such as images or videos, to include in a campaign brief. For instance, the campaign generation engine 862 may determine a prompt to provide to a generative image model. The generative image model may then complete the prompt to produce one or more novel images or videos. For example, the asset database interface 858 may communicate with a generative image model to generate images of Credit Card A in front of a city, a college campus, and a beach restaurant.

In some embodiments, conducting interactive incident response may involve receiving interactive input. For example, the campaign messaging interface 860 may transmit an instruction to a client machine to present a user interface that includes some or all of the information generated for the campaign brief for a tenant. The client machine may be authenticated to a database system account associated with the tenant. The client machine may then receive user input indicating a refinement to the campaign brief. This user input may be used by the campaign generation engine 862 to determine an updated campaign brief that reflects the refinement. The updated campaign brief may be determined at least in part by transmitting one or more prompts to a generative language model and determining one or refinements to implement based on output provided by the generative language model.

In some embodiments, one or more of the elements shown in FIG. 8 may be divided across potentially many physical devices. For example, a computing services environment may include potentially may application servers accessing database storage systems organized across many physical devices.

FIG. 9 illustrates a method 900 of tuning a campaign generation language model, performed in accordance with one or more embodiments. In some embodiments, the method 900 may be performed at one or more computing devices in a computing services environment. For instance, the method 900 may be performed at the system 1716 shown in FIG. 17.

According to various embodiments, the method 900 may be performed in order to determine tuning data to tune a general-purpose large language model for the generation of language in the context of database system incident response. Such tuning may be performed for a particular computing environment and/or database tenant so that the model is tuned for a particular context. The method 900 may be implemented to allow the system to incorporate feedback from incident resolutions, learning and optimizing its algorithms for better future responses.

A request to tune a generative language model for campaign evaluation is received at 902. In some implementations, the request may be generated periodically. For example, the generative language model may be tuned once per week or according to some other cadence. As another example, the generative language model may be tuned upon the detection of a triggering condition, such as upon the receipt of new input data or a request from a systems administrator.

Initial tuning data for the generative language model is identified at 904. In the event that the generative language model has been tuned before, then the initial tuning data may include tuning data stored from one or more previous tuning iterations. Alternatively, if the generative language model has not yet been tuned for campaign generation, then the tuning data may be initialized with default weights. As still another possibility, initial tuning data may be received from a trust layer that facilitates the detection of toxicity and/or other dangerous, unethical, or unsupported requests or responses.

Campaign generation input and output information is identified at 906. According to various embodiments, the campaign generation input and output information may include data from previously generated campaigns, allowing the system to adapt to preferences and content. Examples of such data include campaign messages, campaign assets, experiments, campaign feedback, campaign administrator feedback, personalization information, target audience segments, tone information and/or any other text or non-text information generated during the course of generating a campaign.

A prompt template is identified at 908. In some embodiments, the prompt template may include one or more natural language instructions executable by a large language model to determine novel text related to campaign generation. For instance, the prompt template may include a natural language instruction to "Determine a target audience for an advertising campaign based on the following information." Additionally, the prompt template may include one or more fillable portions (e.g., <campaign opportunity>, <user instructions>) that may be filled at runtime with information determined dynamically based on information retrieved from the database system and/or provided by a user.

According to various embodiments, different types of input and output information may be associated with different prompt templates. For example, an initial prompt template may include a natural language instruction to generate text corresponding to one or more of the elements shown in FIG. 4. For instance, novel text for multiple types of campaign brief generation information may be generated in the same prompt completion. As another example, a campaign brief revision prompt may include some or all of the novel text generated in the initial prompt, as well as user input and natural language instructions instructing the generative language model to revise the campaign brief based on the user input.

A generative language model prompt is determined at 910 based on the prompt template and the input and output information. In some embodiments, determining the generative language model prompt may involve filling the one or more fillable portions of the prompt template with the input information determined at 906.

A prompt completion is determined at 912 based on the prompt. In some implementations, the prompt completion may be determined by providing the prompt to the generative language model interface 252. The generative language model may then execute the natural language instructions included in the prompt to determine novel text based on the input information included in the prompt.

Updated tuning data is determined at 914 based on a comparison between the prompt completion and the output information. For example, in the event that the prompt includes a request to generate novel text for determining or revising a campaign brief based on the input data, the generated documentation may be compared with corresponding text in the output data. In this way, the language model may be tuned to generate campaign brief elements mirroring that generated by humans in the course of manual campaign brief generation. As another example, in the event that the prompt includes a request to determine text identifying a target audience, the recommended target audience may be compared with an actual target audience selected by a human. In this way, the generative language model may be tuned to determine a recommended target audience that mirrors that determined by humans in the course of generating a campaign brief.

In some embodiments, one or more prompts may instruct the generative language model to determine multiple versions of the same text. Alternatively, or additionally, multiple prompts may be transmitted to a generative language model which, when combined with the stochastic nature of generative language models, may lead to different outcomes for the same input prompt. In this way, the generative language model may be tuned more efficiently by comparing multiple generated outcomes against the outcomes in the training data.

In some implementations, multiple generated outcomes may be used in the course of campaign brief generation. For example, a user may select from among a set of generated outcomes for use in a campaign brief. As another example, the system may employ alternative novel text to configure and execute experiments to determine which approach leads to better performance metrics. Techniques for conducting campaign experimentation are discussed in additional detail with respect to the method 1300 shown in FIG. 13.

A determination is made at 916 as to whether to continue tuning the generative language model. In some embodiments, the determination may be made at least in part based on the comparison made at 914. For instance, tuning may continue while a difference between the output information and information included in the prompt completion exceeds a designated threshold.

Upon determining not to continue tuning the generative language mode, the tuning data is stored at 918. In some embodiments, the tuning data may be stored in the database system. The stored tuning data may then be used to generate textual information for the purposes of generating a campaign.

Figure 10:
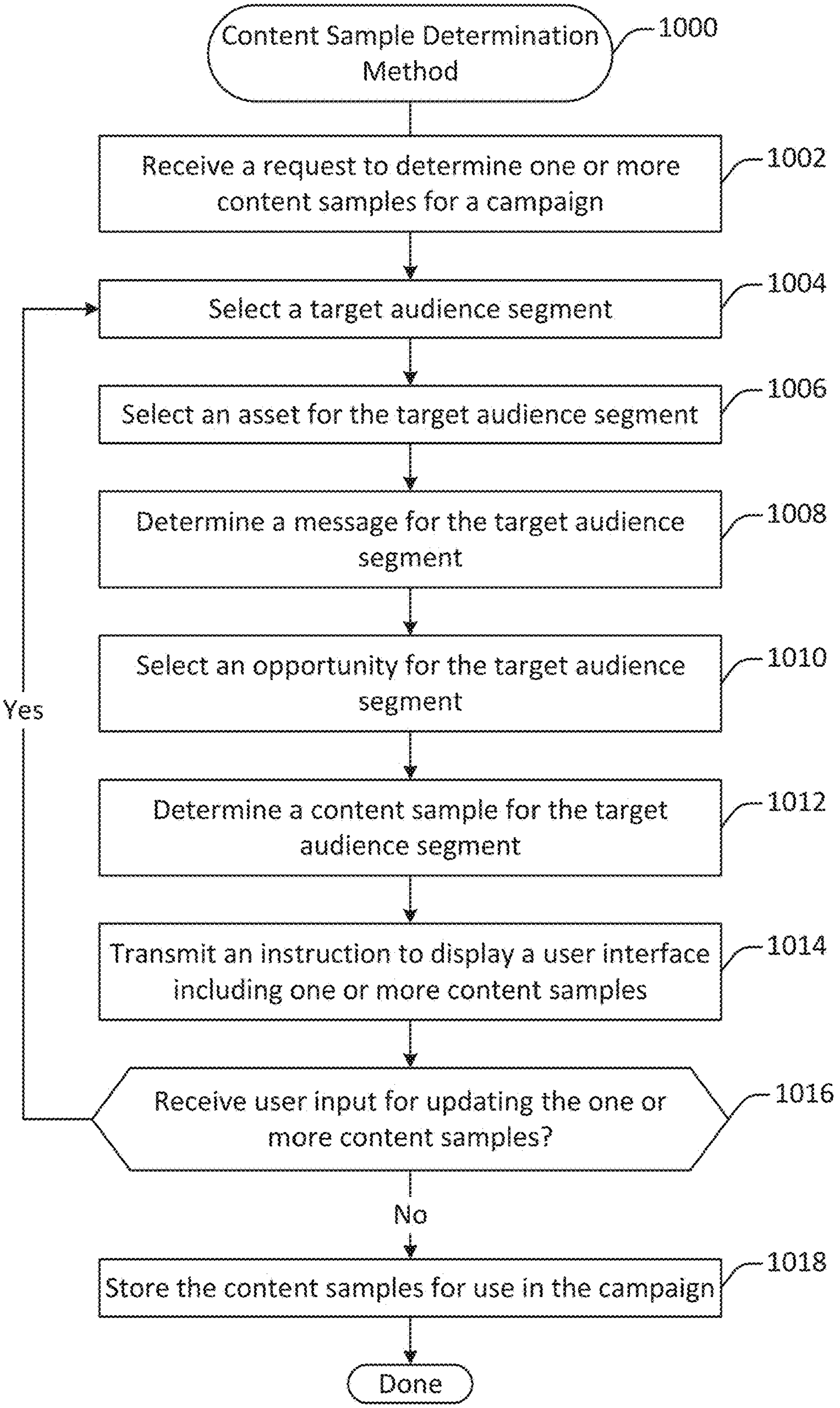
FIG. 10 illustrates a method of determining content samples, performed in accordance with one or more embodiments.

FIG. 10 illustrates a method 1000 of determining content samples, performed in accordance with one or more embodiments. In some embodiments, the method 1000 may be performed at a database system providing computing services to various tenants via the internet.

At 1002, a request to determine one or more content samples for a campaign is received. In some embodiments, the request may be generated as part of a process for determining a campaign brief preview, for instance as discussed with respect to the method 100 shown in FIG. 1.

A target audience segment is selected at 1004. In some embodiments, a target audience segment may be selected based on user input. Alternatively, target audience segments may be automatically selected for content sample creation. For instance, selecting the target audience segment may involve selecting a subset of the target audience determined at operation 208 shown in FIG. 2. Target audience segments may be selected for analysis in sequence or in parallel.

An asset for the target audience segment is selected or generated at 1006. According to various embodiments, the asset may be an image, an audio file, a video, or any other suitable content for communicating with an audience. The asset may be tailored specifically to a particular communication format, such as email, social media, websites, or the like.

In some embodiments, the asset may be selected based on an automated process such as a machine learning algorithm. For instance, the database system may transmit an instruction to select from a pool of stock assets an asset that reflects one or more characteristics of the campaign brief such as the target audience segment, the tone, the message, the opportunity, and the like.

In some embodiments, the asset may be generated based on an automated process such as a generative image model. For instance, the generative image model may be provided with a prompt determined based on the campaign brief. The generative image model may then respond with one or more novel images or videos generated based on the prompt. For example, images may be created of a Credit Card A in front of a city, a college campus, and a beach restaurant.

A message for the target audience segment is selected at 1008. In some embodiments, the message for the target audience segment may be generated by a large language model. The large language model may be prompted to generate a message by providing information such as the identity of the target audience segment, a key message to convey, one or more dimensions along which to vary the key message, information about message tone, and the like. The large language model may then be provided with one or more natural language instructions for generating the message. Such information may be included in a prompt provided to the large language model, with the large language model completing the prompt by generating novel text.

An opportunity for the target audience segment is selected at 1010. According to various embodiments, the opportunity may be determined by matching the target audience segment with a particular opportunity from one or more available opportunities based on the characteristics of the target audience segment and the one or more opportunities.

A content sample for the target audience segment is determined at 1012. In some embodiments, determining the content sample may involve combining the message, the asset, and the opportunity. For instance, one or more standard templates may be used for combining such elements.

An instruction to display a user interface including one or more content samples is transmitted at 1014. In some embodiments, the instruction may be transmitted from the database system to a client machine. The instruction may cause the client machine to present the content samples generated as discussed at 1012.

Figure 11:
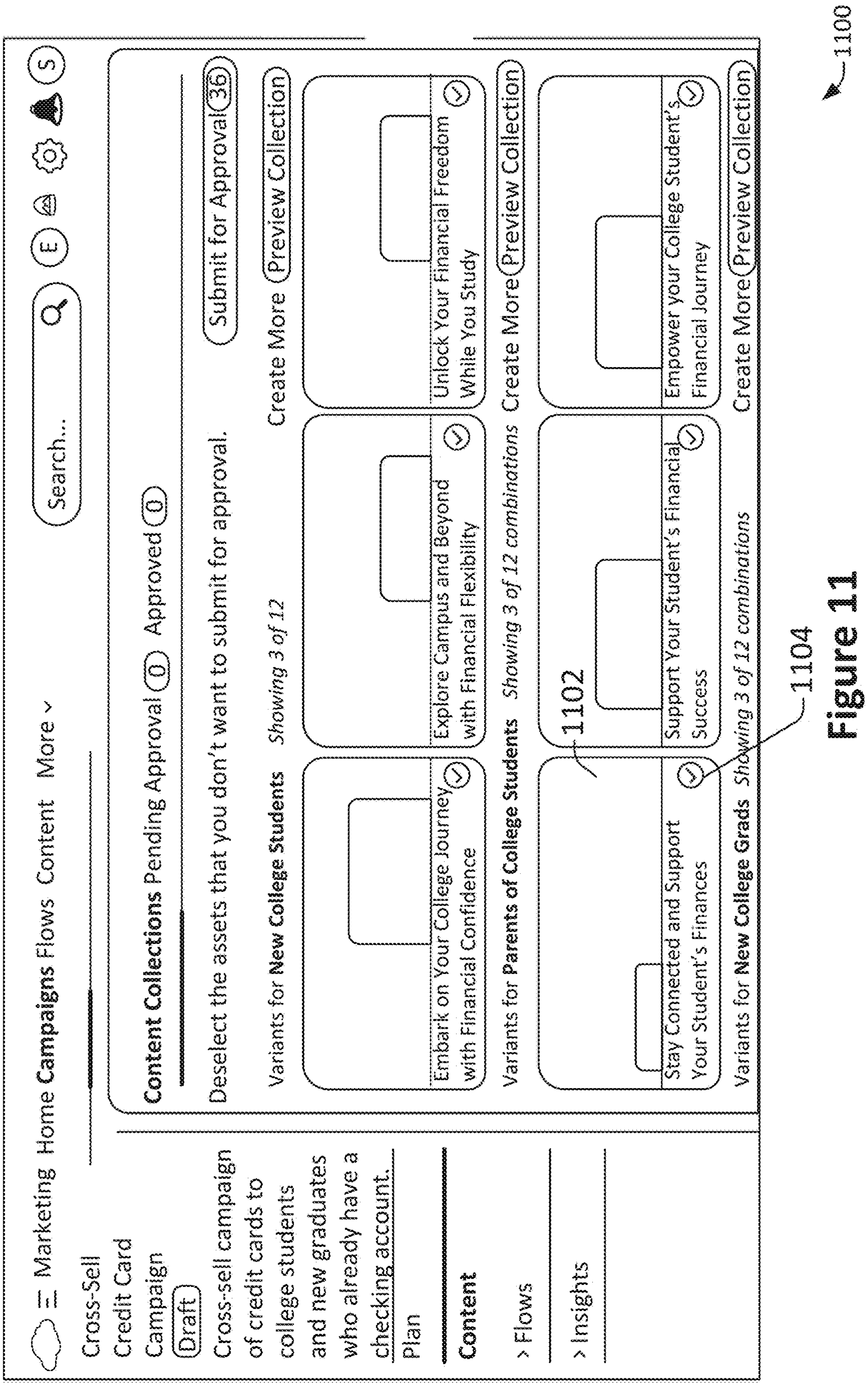
FIG. 11 and FIG. 12 illustrate user interfaces generated in accordance with one or more embodiments.

FIG. 11 illustrates a user interface 1100 generated in accordance with techniques and mechanisms described herein. In FIG. 11, the content sample 1102 provides an example of the output of the operations shown in FIG. 11. The content sample 1102 is targeted to a particular target audience segment (i.e., "Parents of College Students"). The content sample 1102 includes an asset (e.g., a picture of a parent and college student), an opportunity (e.g., a travel credit card), and a message (e.g., "Stay Connected and Support Your Student's Finances") automatically selected to match the target audience segment.

Returning to FIG. 10, a determination is made at 1016 as to whether user input for updating the one or more content samples is received. In some embodiments, the determination made at 1016 may involve identifying whether user input has indicated a desire to accept the existing content samples or to revise the set of content samples. For instance, in FIG. 11, the content sample 1102 may be deselected by unchecking the checkmark at 1104.

Figure 12:
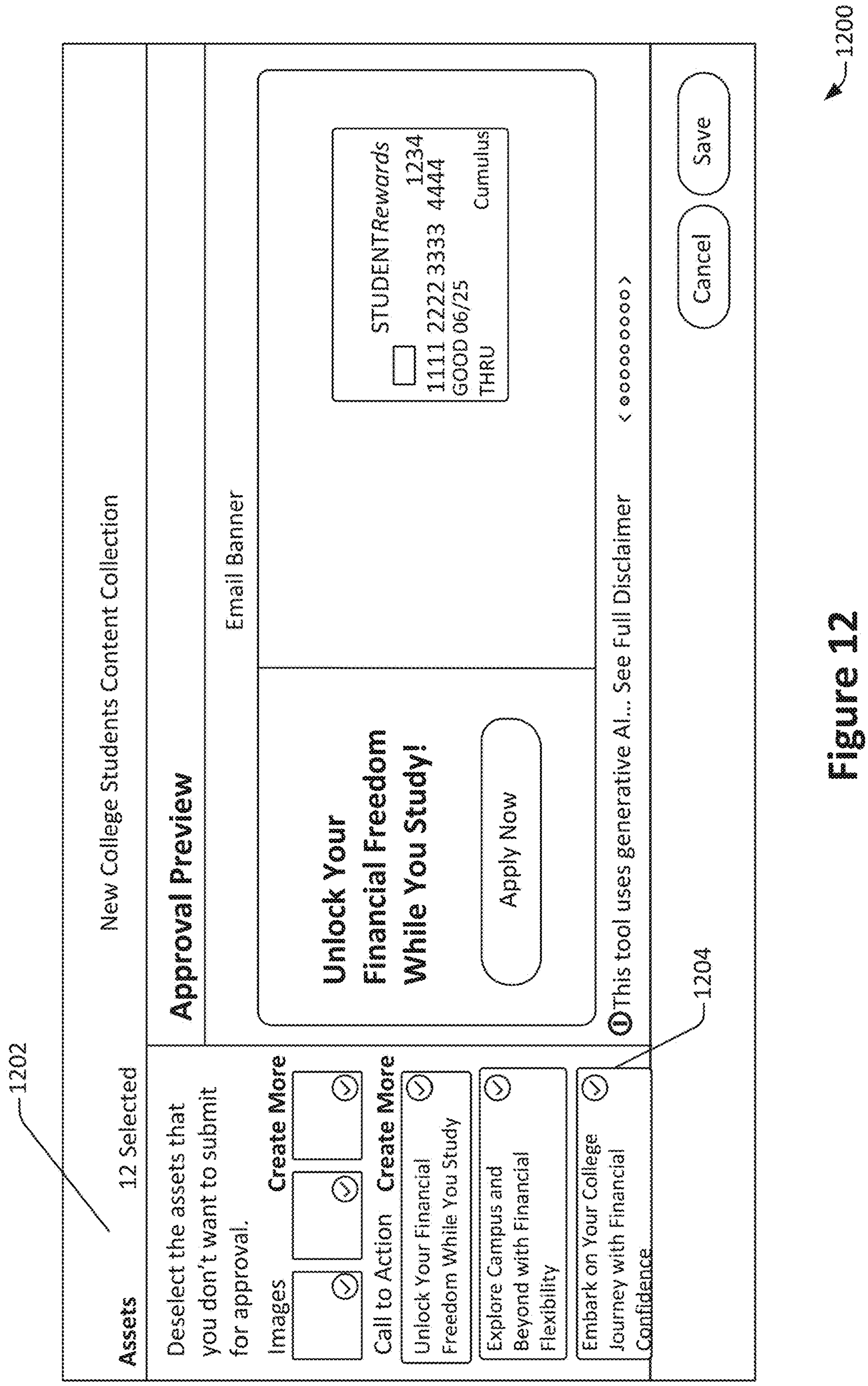

As another example of user input for updating one or more content samples, FIG. 12 illustrates a user interface 1200 generated in accordance with techniques and mechanisms described herein. In FIG. 12, elements of content samples are shown at 1202. A user may provide user input to deselect assets, messages, and/or other aspects of the content samples, for instance by clicking the check mark at 1204.

Returning to FIG. 10, upon determining that the one or more content samples are not to be updated, at 1018 the content samples are stored for use in the campaign. In some embodiments, the content samples may be transmitted to users in accordance with the parameters defined by the campaign.

Figure 13:
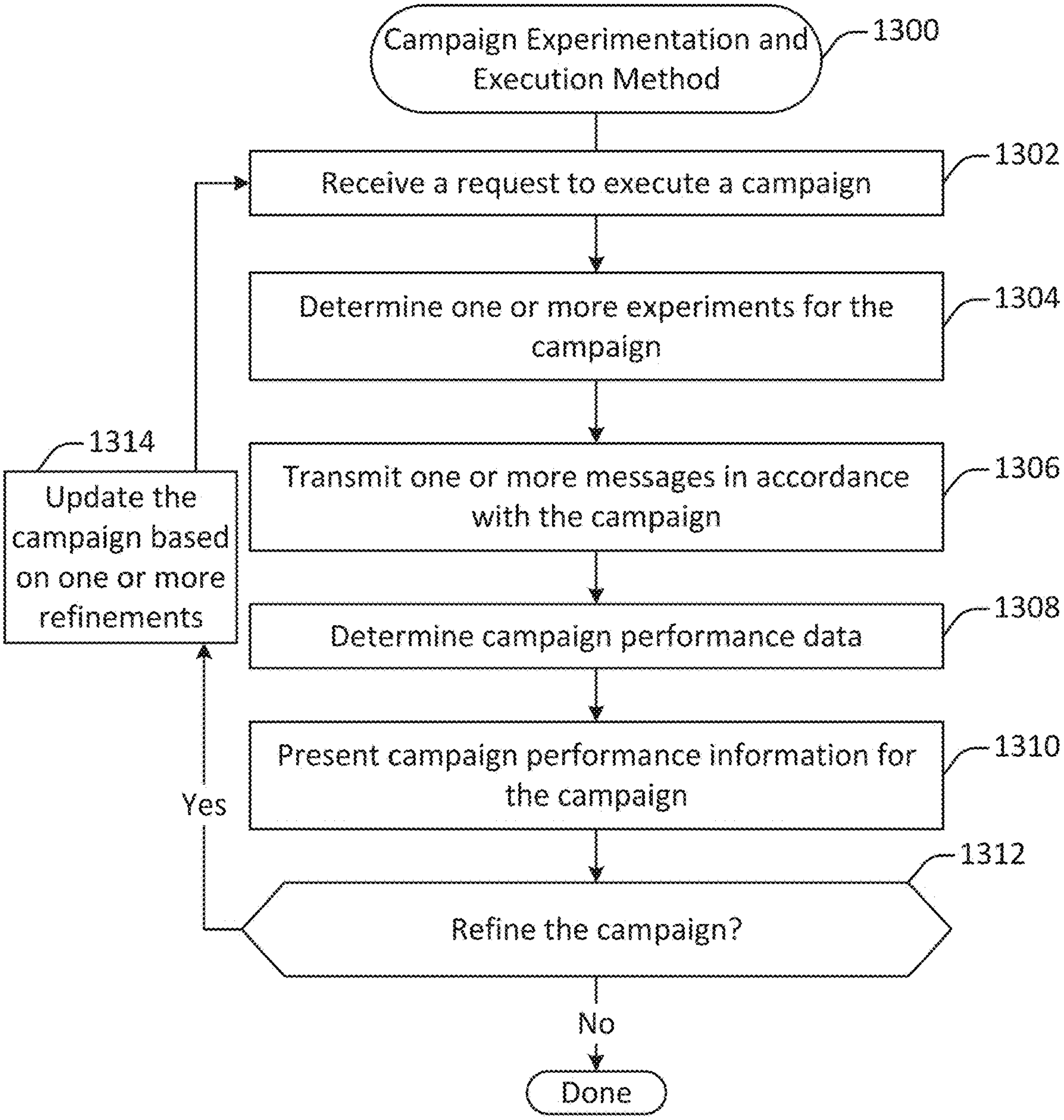
FIG. 13 illustrates a method for refining a campaign brief, performed in accordance with one or more embodiments.

FIG. 13 illustrates a method 1300 for refining a campaign brief, performed in accordance with one or more embodiments. The method 1300 may be performed in order to revise a campaign brief generated as discussed with respect to the method 1000 shown in FIG. 10 based on user feedback.

A request to execute a campaign is received at 1302. In some embodiments, the request may be generated as discussed with respect to FIG. 1. That is, the request may be generated after determining and refining a campaign brief based on a campaign recommendation, and determining campaign content samples as discussed with respect to the method 1000 shown in FIG. 10.

One or more experiments for the campaign are optionally determined at 1304. In some embodiments, an experiment for a campaign may be a test in which different target audience members are presented with different content samples in a manner designed to elicit performance information about the content samples. For example, an experiment may vary one or more of a message, an asset, an opportunity, message timing, message frequency, and/or a communication channel for a content sample.

One or more messages are transmitted in accordance with the campaign at 1306. According to various embodiments, a message may be an email, a social media post, or any other suitable directed communication sent to a target audience member. The target audience member may be selected from the database system. The message may include a content sample created as discussed with respect to the method 1000 shown in FIG. 10.

In some embodiments, some or all of the one or more messages may be transmitted in accordance with the one or more experiments determined at 1304. For instance, different content samples may be transmitted to different groups of people within the same target audience segment.

Campaign performance data is determined at 1308. In some embodiments, the campaign performance data may include measurements about response variables such as opportunity update rates, click through rates, and the like. Such information may be stored in the database system for analysis.

Campaign performance information is presented for the campaign at 1310. In some embodiments, the campaign performance information may be presented via one or more user interfaces displayed at a client machine based on instructions sent from the database system.

Figure 14:
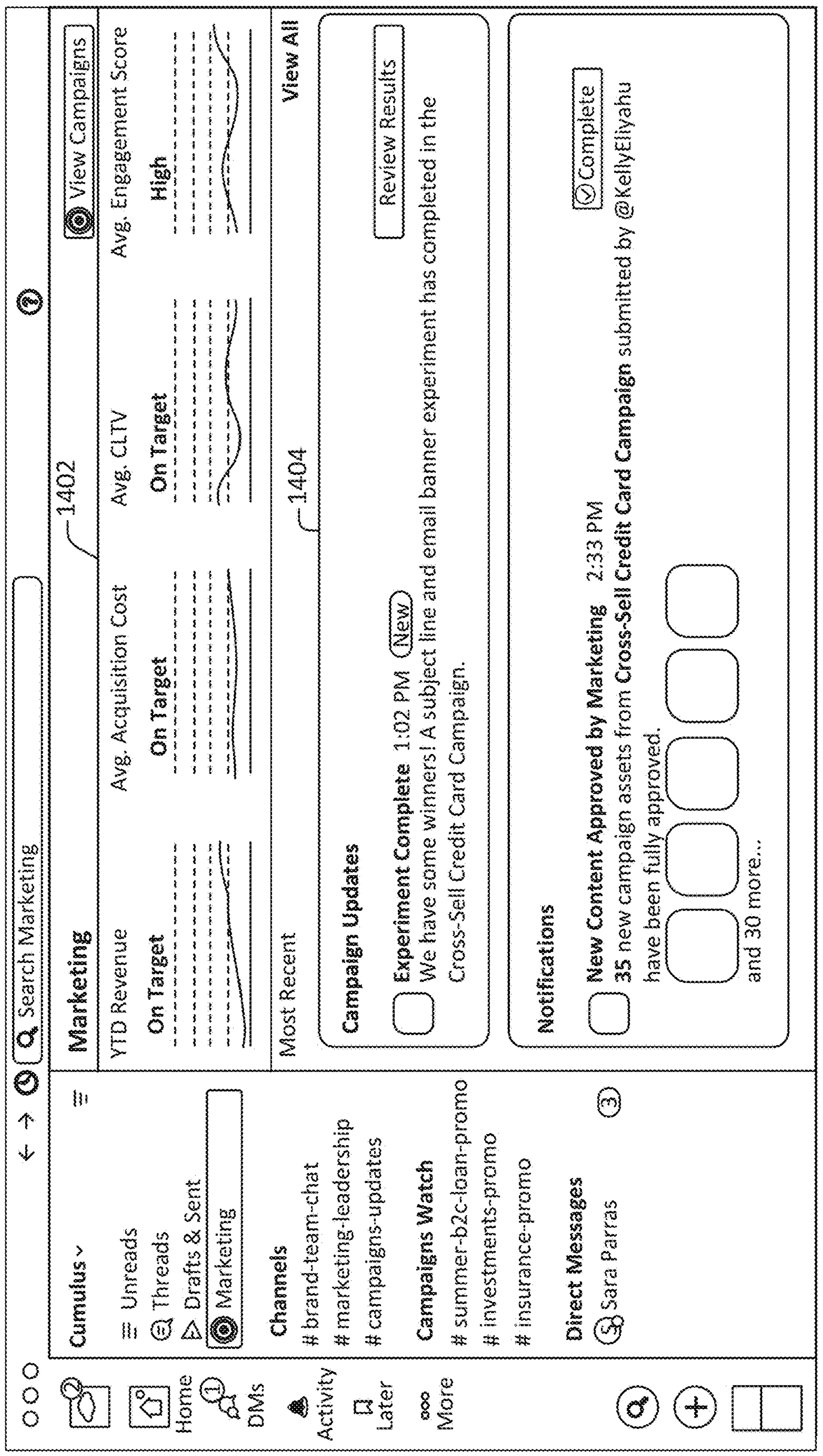
FIG. 14, FIG. 15, and FIG. 16 illustrate user interfaces generated in accordance with one or more embodiments.
Figure 15:
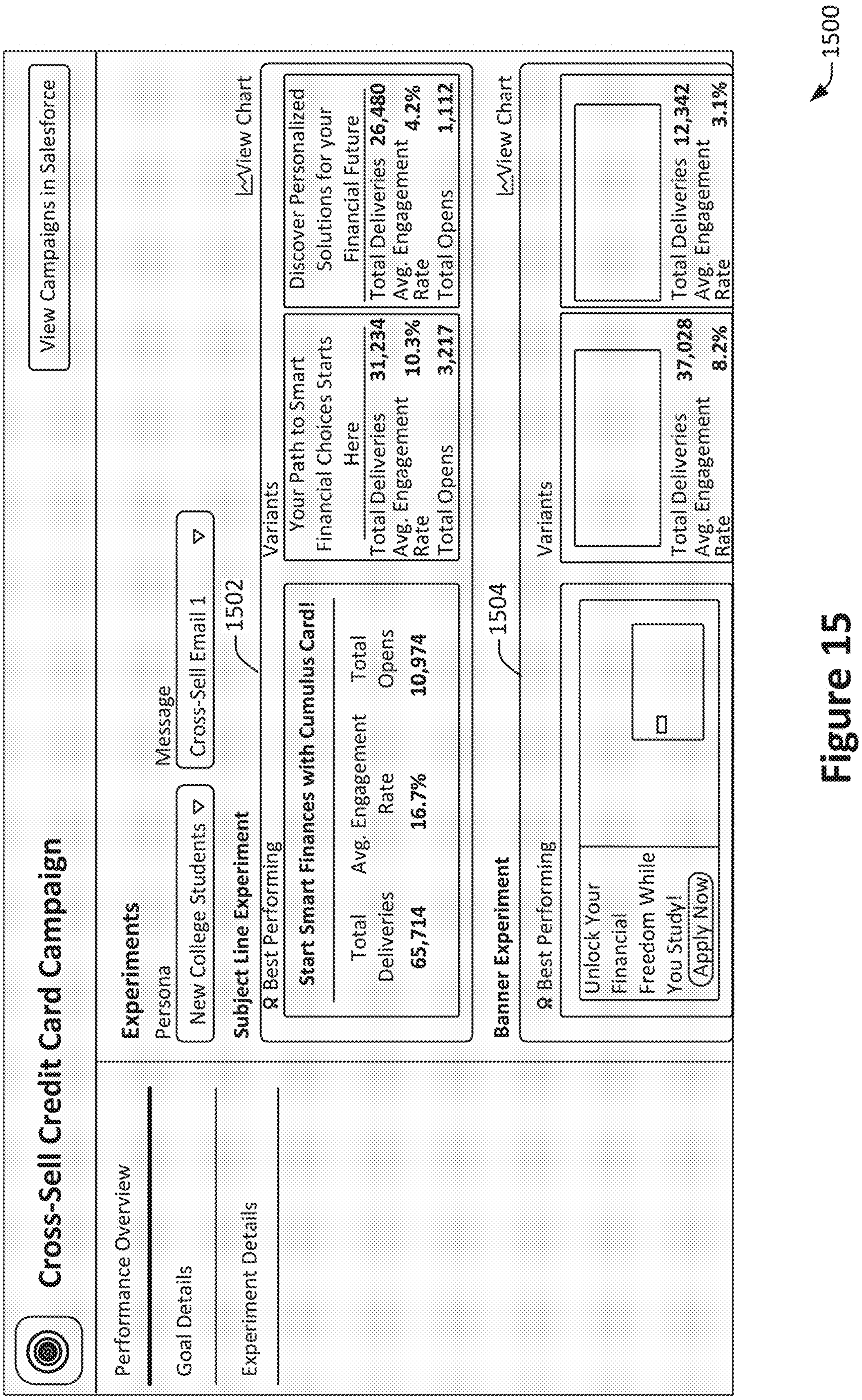
Figure 16:
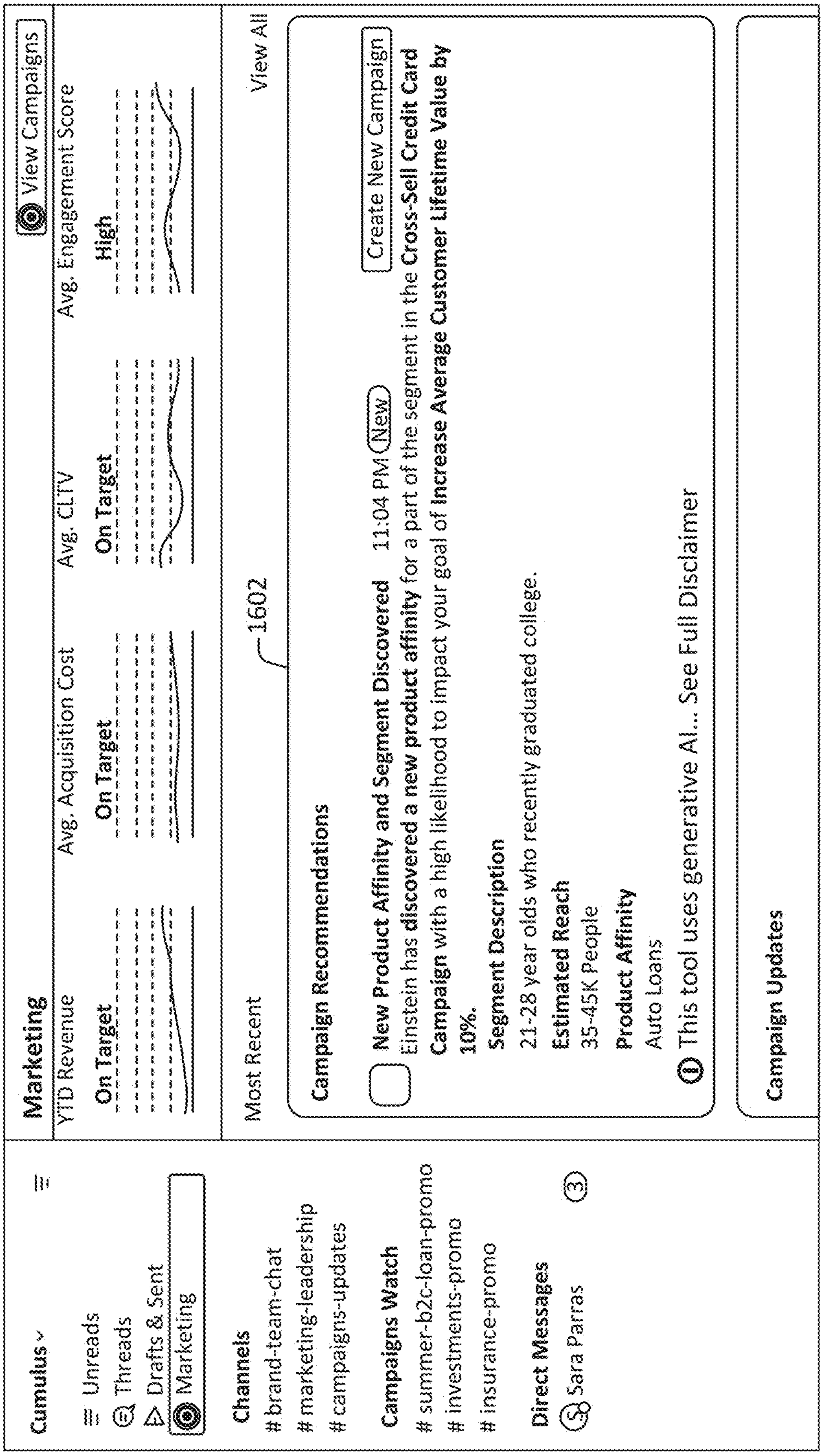

FIG. 14, FIG. 15, and FIG. 16 illustrate user interfaces 1400, 1500, and 1600 generated in accordance with techniques and mechanisms described herein. In FIG. 14, information about campaign performance data is presented at 1402. Overview information about a completed experiment is shown at 1404. In FIG. 15, detailed information about completed experiments is shown at 1502 and 1504. At 1502, the best performing message of a set of messages is shown. The best performing message has a higher average engagement rate (i.e., 16.7%) than the alternative variants (i.e., 10.3% and 4.2%). At 1504, the best performing content sample of a series of content samples is shown.

Returning to FIG. 13, a determination is made at 1312 as to whether to refine the campaign. In some embodiments, the determination may be made based on user input. For instance, at 1602 in FIG. 16, a user is presented with an opportunity to create a new campaign based on information determined during the execution of the existing campaign.

Upon making a determination to refine the campaign, the campaign is refined at 1314. According to various embodiments, the manner in which the campaign is refined may depend on the type of information that has been gathered and any user input provided by the user. For instance, the user may request to create a new campaign or update an existing campaign. Updating a campaign may involve, for example, refining a target market, updating one or more content samples, determining an additional experiment, changing one or more messages, and the like.

Figure 17:
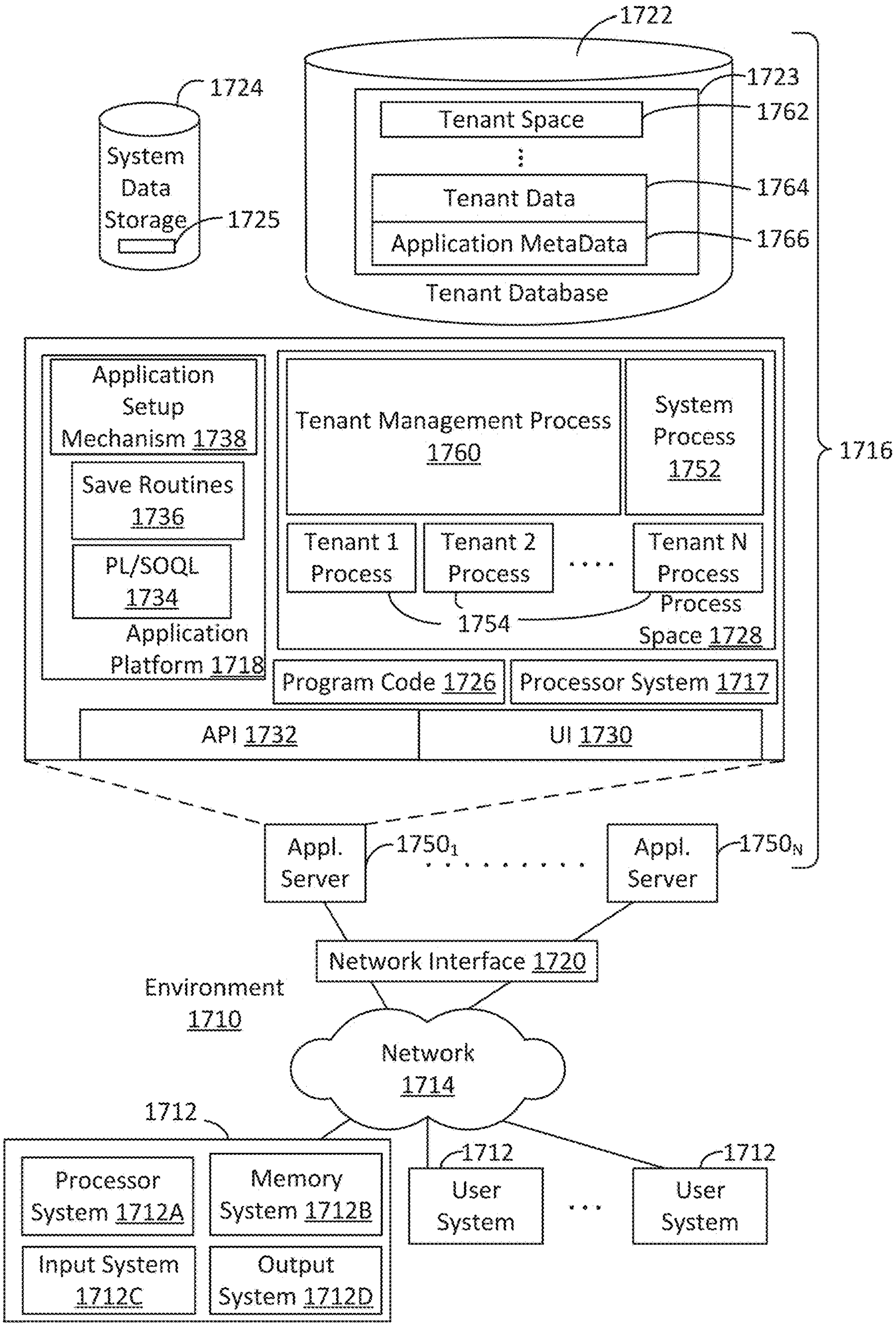
FIG. 17 shows a block diagram of an example of an environment that includes an on-demand database service configured in accordance with some implementations.

FIG. 17 shows a block diagram of an example of an environment 1710 that includes an on-demand database service configured in accordance with some implementations. Environment 1710 may include user systems 1712, network 1714, database system 1716, processor system 1717, application platform 1718, network interface 1720, tenant data storage 1722, tenant data 1723, system data storage 1724, system data 1725, program code 1726, process space 1728, User Interface (UI) 1730, Application Program Interface (API) 1732, PL/SOQL 1734, save routines 1736, application setup mechanism 1738, application servers 1750-1 through 1750-N, system process space 1752, tenant process spaces 1754, tenant management process space 1760, tenant storage space 1762, user storage 1764, and application metadata 1766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1718 may be a framework that allows the creation, management, and execution of applications in system 1716. Such applications may be developed by the database service provider or by users or third-party application developers accessing the service. Application platform 1718 includes an application setup mechanism 1738 that supports application developers' creation and management of applications, which may be saved as metadata into tenant data storage 1722 by save routines 1736 for execution by subscribers as one or more tenant process spaces 1754 managed by tenant management process 1760 for example. Invocations to such applications may be coded using PL/SOQL 1734 that provides a programming language style interface extension to API 1732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1766 for a subscriber making such an invocation. Such system processes may also manage execution of application metadata 1766 as an application in a virtual machine.

In some implementations, each application server 1750 may handle requests for any user associated with any organization. A load balancing function (e.g., an F5 Big-IP load balancer) may distribute requests to the application servers 1750 based on an algorithm such as least-connections, round robin, observed response time, etc. Each application server 1750 may be configured to communicate with tenant data storage 1722 and the tenant data 1723 therein, and system data storage 1724 and the system data 1725 therein to serve requests of user systems 1712. The tenant data 1723 may be divided into individual tenant storage spaces 1762, which can be either a physical arrangement and/or a logical arrangement of data. Within each tenant storage space 1762, user storage 1764 and application metadata 1766 may be similarly allocated for each user. For example, a copy of a user's most recently used (MRU) items might be stored to user storage 1764. Similarly, a copy of MRU items for an entire tenant organization may be stored to tenant storage space 1762. A UI 1730 provides a user interface and an API 1732 provides an application programming interface to system 1716 resident processes to users and/or developers at user systems 1712.

System 1716 may implement a web-based campaign brief management system. For example, in some implementations, system 1716 may include application servers configured to implement and execute campaign brief generation and execution software applications. The application servers may be configured to provide related data, code, forms, web pages and other information to and from user systems 1712. Additionally, the application servers may be configured to store information to, and retrieve information from a database system. Such information may include related data, objects, and/or Webpage content. With a multi-tenant system, data for multiple tenants may be stored in the same physical database object in tenant data storage 1722, however, tenant data may be arranged in the storage medium(s) of tenant data storage 1722 so that data of one tenant is kept logically separate from that of other tenants. In such a scheme, one tenant may not access another tenant's data, unless such data is expressly shared.

Several elements in the system shown in FIG. 17 include conventional, well-known elements that are explained only briefly here. For example, user system 1712 may include processor system 1712A, memory system 1712B, input system 1712C, and output system 1712D. A user system 1712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1712 to access, process and view information, pages and applications available from system 1716 over network 1714. Network 1714 may be any network or combination of networks of devices that communicate with one another, such as any one or any combination of a LAN (local area network), WAN (wide area network), wireless network, or other appropriate configuration.

The users of user systems 1712 may differ in their respective capacities, and the capacity of a particular user system 1712 to access information may be determined at least in part by "permissions" of the particular user system 1712. As discussed herein, permissions generally govern access to computing resources such as data objects, components, and other entities of a computing system, such as a campaign brief generation and/or execution system, a social networking system, and/or a CRM database system. "Permission sets" generally refer to groups of permissions that may be assigned to users of such a computing environment. For instance, the assignments of users and permission sets may be stored in one or more databases of System 1716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1716 may provide on-demand database service to user systems 1712 using an MTS arrangement. By way of example, one tenant organization may be a company that employs a sales force where each salesperson uses system 1716 to manage their sales process. Thus, a user in such an organization may maintain contact data, leads data, customer follow-up data, performance data, goals and progress data, etc., all applicable to that user's personal sales process (e.g., in tenant data storage 1722). In this arrangement, a user may manage his or her sales efforts and cycles from a variety of devices, since relevant data and applications to interact with (e.g., access, view, modify, report, transmit, calculate, etc.) such data may be maintained and accessed by any user system 1712 having network access.

When implemented in an MTS arrangement, system 1716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1716 may also maintain system-level data usable by multiple tenants or other data. Such system-level data may include industry reports, news, postings, and the like that are sharable between tenant organizations.

In some implementations, user systems 1712 may be client systems communicating with application servers 1750 to request and update system-level and tenant-level data from system 1716. By way of example, user systems 1712 may send one or more queries requesting data of a database maintained in tenant data storage 1722 and/or system data storage 1724. An application server 1750 of system 1716 may automatically generate one or more SQL statements (e.g., one or more SQL queries) that are designed to access the requested data. System data storage 1724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 18A:
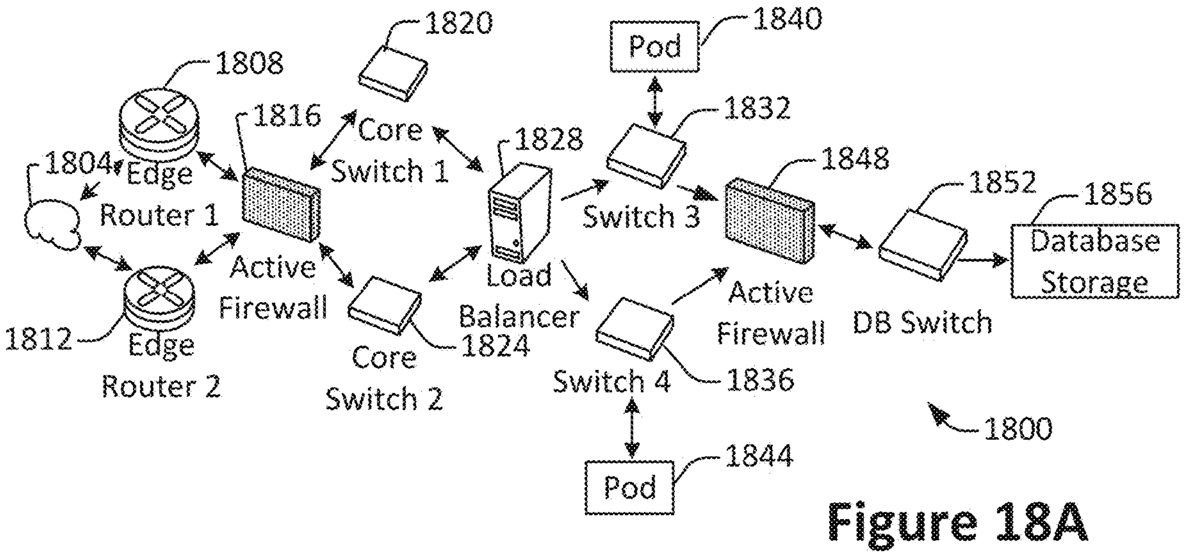
FIG. 18A shows a system diagram of an example of architectural components of an on-demand database service environment, configured in accordance with some implementations.

FIG. 18A shows a system diagram of an example of architectural components of an on-demand database service environment 1800, configured in accordance with some implementations. A client machine located in the cloud 1804 may communicate with the on-demand database service environment via one or more edge routers 1808 and 1812. A client machine may include any of the examples of user systems 1712 described above. The edge routers 1808 and 1812 may communicate with one or more core switches 1820 and 1824 via firewall 1816. The core switches may communicate with a load balancer 1828, which may distribute server load over different pods, such as the pods 1840 and 1844 by communication via pod switches 1832 and 1836. The pods 1840 and 1844, which may each include one or more servers and/or other computing resources, may perform data processing and other operations used to provide on-demand services. Components of the environment may communicate with a database storage 1856 via a database firewall 1848 and a database switch 1852.

Accessing an on-demand database service environment may involve communications transmitted among a variety of different components. The environment 1800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 18A and 18B.

The cloud 1804 refers to any suitable data network or combination of data networks, which may include the Internet. Client machines located in the cloud 1804 may communicate with the on-demand database service environment 1800 to access services provided by the on-demand database service environment 1800. By way of example, client machines may access the on-demand database service environment 1800 to retrieve, store, edit, and/or process campaign brief generation information such as CRM data, assets, and the like.

In some implementations, the edge routers 1808 and 1812 route packets between the cloud 1804 and other components of the on-demand database service environment 1800. The edge routers 1808 and 1812 may employ the Border Gateway Protocol (BGP). The edge routers 1808 and 1812 may maintain a table of IP networks or 'prefixes', which designate network reachability among autonomous systems on the internet.

In one or more implementations, the firewall 1816 may protect the inner components of the environment 1800 from internet traffic. The firewall 1816 may block, permit, or deny access to the inner components of the on-demand database service environment 1800 based upon a set of rules and/or other criteria. The firewall 1816 may act as one or more of a packet filter, an application gateway, a stateful filter, a proxy server, or any other type of firewall.

In some implementations, the core switches 1820 and 1824 may be high-capacity switches that transfer packets within the environment 1800. The core switches 1820 and 1824 may be configured as network bridges that quickly route data between different components within the on-demand database service environment. The use of two or more core switches 1820 and 1824 may provide redundancy and/or reduced latency.

In some implementations, communication between the pods 1840 and 1844 may be conducted via the pod switches 1832 and 1836. The pod switches 1832 and 1836 may facilitate communication between the pods 1840 and 1844 and client machines, for example via core switches 1820 and 1824. Also or alternatively, the pod switches 1832 and 1836 may facilitate communication between the pods 1840 and 1844 and the database storage 1856. The load balancer 1828 may distribute workload between the pods, which may assist in improving the use of resources, increasing throughput, reducing response times, and/or reducing overhead. The load balancer 1828 may include multilayer switches to analyze and forward traffic.

In some implementations, access to the database storage 1856 may be guarded by a database firewall 1848, which may act as a computer application firewall operating at the database application layer of a protocol stack. The database firewall 1848 may protect the database storage 1856 from application attacks such as structure query language (SQL) injection, database rootkits, and unauthorized information disclosure. The database firewall 1848 may include a host using one or more forms of reverse proxy services to proxy traffic before passing it to a gateway router and/or may inspect the contents of database traffic and block certain content or database requests. The database firewall 1848 may work on the SQL application level atop the TCP/IP stack, managing applications' connection to the database or SQL management interfaces as well as intercepting and enforcing packets traveling to or from a database network or application interface.

In some implementations, the database storage 1856 may be an on-demand database system shared by many different organizations. The on-demand database service may employ a single-tenant approach, a multi-tenant approach, a virtualized approach, or any other type of database approach. Communication with the database storage 1856 may be conducted via the database switch 1852. The database storage 1856 may include various software components for handling database queries. Accordingly, the database switch 1852 may direct database queries transmitted by other components of the environment (e.g., the pods 1840 and 1844) to the correct components within the database storage 1856.

Figure 18B:
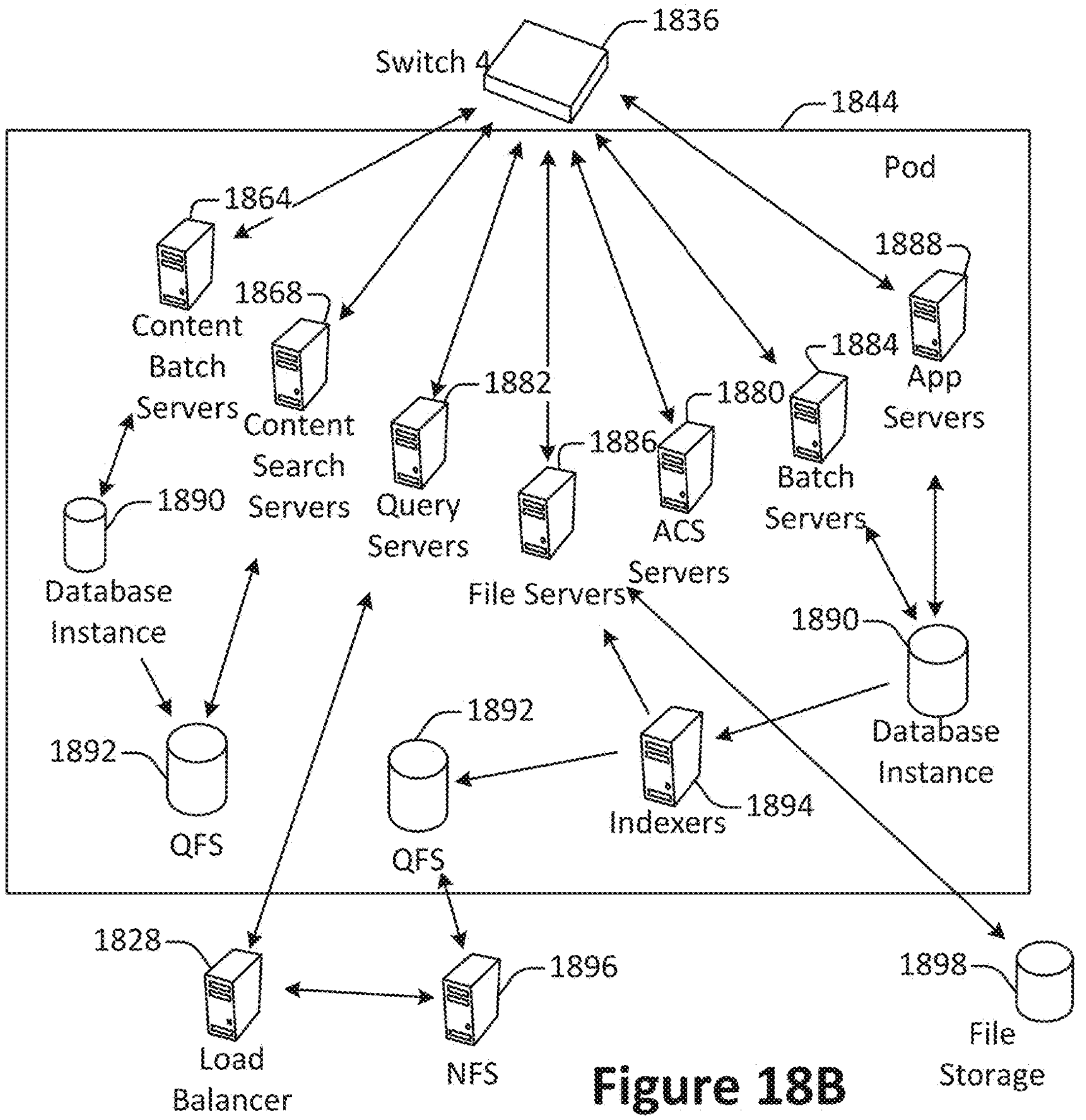
FIG. 18B shows a system diagram further illustrating an example of architectural components of an on-demand database service environment, in accordance with some implementations.

FIG. 18B shows a system diagram further illustrating an example of architectural components of an on-demand database service environment, in accordance with some implementations. The pod 1844 may be used to render services to user(s) of the on-demand database service environment 1800. The pod 1844 may include one or more content batch servers 1864, content search servers 1868, query servers 1882, file servers 1886, access control system (ACS) servers 1880, batch servers 1884, and app servers 1888. Also, the pod 1844 may include database instances 1890, quick file systems (QFS) 1892, and indexers 1894. Some or all communication between the servers in the pod 1844 may be transmitted via the switch 1836.

In some implementations, the app servers 1888 may include a framework dedicated to the execution of procedures (e.g., programs, routines, scripts) for supporting the construction of applications provided by the on-demand database service environment 1800 via the pod 1844. One or more instances of the app server 1888 may be configured to execute all or a portion of the operations of the services described herein.

In some implementations, as discussed above, the pod 1844 may include one or more database instances 1890. A database instance 1890 may be configured as an MTS in which different organizations share access to the same database, using the techniques described above. Database information may be transmitted to the indexer 1894, which may provide an index of information available in the database 1890 to file servers 1886. The QFS 1892 or other suitable filesystem may serve as a rapid-access file system for storing and accessing information available within the pod 1844. The QFS 1892 may support volume management capabilities, allowing many disks to be grouped together into a file system. The QFS 1892 may communicate with the database instances 1890, content search servers 1868 and/or indexers 1894 to identify, retrieve, move, and/or update data stored in the network file systems (NFS) 1896 and/or other storage systems.

In some implementations, one or more query servers 1882 may communicate with the NFS 1896 to retrieve and/or update information stored outside of the pod 1844. The NFS 1896 may allow servers located in the pod 1844 to access information over a network in a manner similar to how local storage is accessed. Queries from the query servers 1822 may be transmitted to the NFS 1896 via the load balancer 1828, which may distribute resource requests over various resources available in the on-demand database service environment 1800. The NFS 1896 may also communicate with the QFS 1892 to update the information stored on the NFS 1896 and/or to provide information to the QFS 1892 for use by servers located within the pod 1844.

In some implementations, the content batch servers 1864 may handle requests internal to the pod 1844. These requests may be long-running and/or not tied to a particular customer, such as requests related to log mining, cleanup work, and maintenance tasks. The content search servers 1868 may provide query and indexer functions such as functions allowing users to search through content stored in the on-demand database service environment 1800. The file servers 1886 may manage requests for information stored in the file storage 1898, which may store information such as documents, images, basic large objects (BLOBs), etc. The query servers 1882 may be used to retrieve information from one or more file systems. For example, the query system 1882 may receive requests for information from the app servers 1888 and then transmit information queries to the NFS 1896 located outside the pod 1844. The ACS servers 1880 may control access to data, hardware resources, or software resources called upon to render services provided by the pod 1844. The batch servers 1884 may process batch jobs, which are used to run tasks at specified times. Thus, the batch servers 1884 may transmit instructions to other servers, such as the app servers 1888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 19:
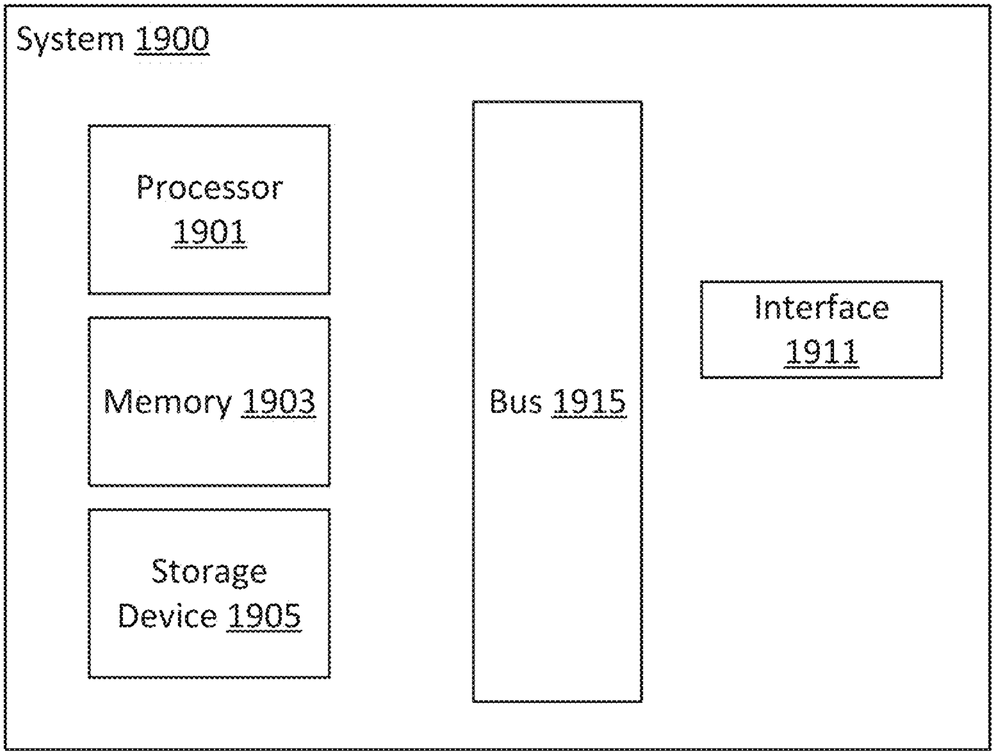
FIG. 19 illustrates one example of a computing device, generated in accordance with one or more embodiments.

FIG. 19 illustrates one example of a computing device. According to various embodiments, a system 1900 suitable for implementing embodiments described herein includes a processor 1901, a memory module 1903, a storage device 1905, an interface 1911, and a bus 1915 (e.g., a PCI bus or other interconnection fabric.) System 1900 may operate as variety of devices such as an application server, a database server, or any other device or service described herein. Although a particular configuration is described, a variety of alternative configurations are possible. The processor 1901 may perform operations such as those described herein. Instructions for performing such operations may be embodied in the memory 1903, on one or more non-transitory computer readable media, or on some other storage device. Various specially configured devices can also be used in place of or in addition to the processor 1901. The interface 1911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing services environment including a hardware processor and memory, the computing services environment comprising:

a database system including one or more database tables storing a plurality of database records reflecting customer relations management interactions between a plurality of tenants of the computer services environment and individuals interacting with the plurality of tenants, the database system configured to determine an input description of a communication campaign between a tenant of the plurality of tenants and a corresponding segment of the individuals;

a generative language model interface configured to determine a textual description of one or more elements of the communication campaign by completing a campaign brief generation prompt via a generative language model, the campaign brief generation prompt including some or all of the input description and a natural language instruction executed by the generative language model to generate the textual description, the generative language model interface being configured to determine a plurality of alternative textual element descriptions for an element of the one or more elements;

a communication interface configured to transmit to a client machine authenticated to a database system account linked to the tenant an instruction to generate a graphical user interface at the client machine, the graphical user interface identifying the segment of the individuals and the textual description, the graphical user interface receiving user input indicating a refinement to the textual description;

a messaging interface configured to transmit messages to selected individuals from the segment of individuals based on the input description and the refinement, the messaging interface being configured to transmit a first message including a first textual element description of the plurality of alternative textual element descriptions to a first subset of the segment of individuals and to transmit a second message including a second textual element description of the plurality of alternative textual element descriptions to a second subset of the segment of individuals; and updating the communication campaign via the generative language model based on a performance metric determined based on the messages.

2. The computing services environment recited in claim 1, wherein the input description of the communication campaign identifies a product or service provided by the tenant.

3. The computing services environment recited in claim 1, wherein the computing services environment is configured to determine a first campaign performance metric for the first message and a second campaign performance metric for the second message, and wherein the computing services environment is configured to select the first message for transmission to a third subset of the segment of individuals based at least in part on a comparison of the first campaign performance metric and the second campaign performance metric.

4. The computing services environment recited in claim 1, wherein the one or more elements include a description of the segment of the individuals.

5. The computing services environment recited in claim 1, wherein the one or more elements include messaging text to include in one or more of the messages.

6. The computing services environment recited in claim 5, wherein the one or more elements include a description of a communication tone for generating the messaging text.

7. The computing services environment recited in claim 5, wherein the one or more elements include a performance indicator for the messages.

8. The computing services environment recited in claim 1, wherein the campaign brief generation prompt is determined by replacing a fillable portion of a campaign brief generation prompt template with some or all of the input description, the campaign brief generation prompt template including the natural language instruction.

9. A method implemented at a computing services environment, the method comprising:

storing a plurality of database records in one or more database tables of a database system, the plurality of database records reflecting customer relations management interactions between a plurality of tenants of the computer services environment and individuals interacting with the plurality of tenants;

determining via a processor an input description of a communication campaign between a tenant of the plurality of tenants and a corresponding segment of the individuals;

determining a textual description of one or more elements of the communication campaign by completing a campaign brief generation prompt via a generative language model, the campaign brief generation prompt including some or all of the input description and a natural language instruction executed by the generative language model to generate the textual description, the generative language model interface being configured to determine a plurality of alternative textual element descriptions for an element of the one or more elements;

transmitting to a client machine authenticated to a database system account linked to the tenant an instruction to generate a graphical user interface at the client machine, the graphical user interface identifying the segment of the individuals and the textual description;

receiving via a communication interface user input provided via the graphical user interface receiving, the user input indicating a refinement to the textual description;

transmitting messages to selected individuals from the segment of individuals based on the input description and the refinement via a messaging interface, the messaging interface being configured to transmit a first message including a first textual element description of the plurality of alternative textual element descriptions to a first subset of the segment of individuals and to transmit a second message including a second textual element description of the plurality of alternative textual element descriptions to a second subset of the segment of individuals; and updating the communication campaign via the generative language model based on a performance metric determined based on the messages.

10. The method recited in claim 9, wherein the input description of the communication campaign identifies a product or service provided by the tenant.

11. The method recited in claim 9, wherein the computing services environment is configured to determine a first campaign performance metric for the first message and a second campaign performance metric for the second message, and wherein the computing services environment is configured to select the first message for transmission to a third subset of the segment of individuals based at least in part on a comparison of the first campaign performance metric and the second campaign performance metric.

12. The method recited in claim 9, wherein the one or more elements include a description of the segment of the individuals.

13. The method recited in claim 9, wherein the one or more elements include messaging text to include in one or more of the messages.

14. The method recited in claim 13, wherein the one or more elements include a description of a communication tone for generating the messaging text.

15. The method recited in claim 9, wherein the campaign brief generation prompt is determined by replacing a fillable portion of a campaign brief generation prompt template with some or all of the input description, the campaign brief generation prompt template including the natural language instruction.

16. One or more non-transitory computer readable media having instructions stored thereon for performing a method implemented at a computing services environment, the method comprising:

storing a plurality of database records in one or more database tables of a database system, the plurality of database records reflecting customer relations management interactions between a plurality of tenants of the computer services environment and individuals interacting with the plurality of tenants;

determining via a processor an input description of a communication campaign between a tenant of the plurality of tenants and a corresponding segment of the individuals;

determining a textual description of one or more elements of the communication campaign by completing a campaign brief generation prompt via a generative language model, the campaign brief generation prompt including some or all of the input description and a natural language instruction executed by the generative language model to generate the textual description, the generative language model interface being configured to determine a plurality of alternative textual element descriptions for an element of the one or more elements;

transmitting to a client machine authenticated to a database system account linked to the tenant an instruction to generate a graphical user interface at the client machine, the graphical user interface identifying the segment of the individuals and the textual description;

receiving via a communication interface user input provided via the graphical user interface receiving, the user input indicating a refinement to the textual description;

transmitting messages to selected individuals from the segment of individuals based on the input description and the refinement via a messaging interface, the messaging interface being configured to transmit a first message including a first textual element description of the plurality of alternative textual element descriptions to a first subset of the segment of individuals and to transmit a second message including a second textual element description of the plurality of alternative textual element descriptions to a second subset of the segment of individuals; and updating the communication campaign via the generative language model based on a performance metric determined based on the messages.

* * * * *